US012276036B2

(12) United States Patent
Tanaka et al.

(10) Patent No.: US 12,276,036 B2
(45) Date of Patent: Apr. 15, 2025

(54) SEPARATOR MEMBRANE-GASKET-PROTECTING MEMBER ASSEMBLY, ELECTROLYSIS ELEMENT, AND ELECTROLYSIS VESSEL

(71) Applicant: TOKUYAMA CORPORATION, Shunan (JP)

(72) Inventors: Yasuyuki Tanaka, Shunan (JP); Yasunori Miyagawa, Shunan (JP)

(73) Assignee: TOKUYAMA CORPORATION, Shunan (JP)

( * ) Notice: Subject to any disclaimer, the term of this patent is extended or adjusted under 35 U.S.C. 154(b) by 35 days.

(21) Appl. No.: 17/989,916

(22) Filed: Nov. 18, 2022

(65) Prior Publication Data

US 2023/0082257 A1 Mar. 16, 2023

Related U.S. Application Data

(62) Division of application No. 16/979,310, filed as application No. PCT/JP2019/010095 on Mar. 12, 2019, now abandoned.

(30) Foreign Application Priority Data

Mar. 27, 2018 (JP) ................. 2018-060648

(51) Int. Cl.
*C25B 9/23* (2021.01)
*C25B 1/04* (2021.01)
(Continued)

(52) U.S. Cl.
CPC .................. *C25B 9/23* (2021.01); *C25B 1/04* (2013.01); *C25B 9/05* (2021.01); *C25B 9/73* (2021.01); *C25B 9/77* (2021.01); *C25B 13/02* (2013.01)

(58) Field of Classification Search
CPC .... C25B 9/19; C25B 9/23; C25B 9/77; C25B 9/73; C25B 1/04; C25B 13/02
See application file for complete search history.

(56) References Cited

U.S. PATENT DOCUMENTS 4,488,946 A 12/1984 Morris et al.
4,877,499 A 10/1989 Beaver et al.
(Continued)

FOREIGN PATENT DOCUMENTS

EP 1 022 359 A1 7/2000
JP 63-216989 A 9/1988
(Continued)

*Primary Examiner* — Ciel P Contreras
(74) *Attorney, Agent, or Firm* — Birch, Stewart, Kolasch & Birch, LLP

(57) ABSTRACT

A separating membrane-gasket-protecting member assembly including: an ion-permeable separating membrane; a gasket holding a periphery of the membrane; and a frame-shaped protecting member holding the gasket; the protecting member including: a frame-shaped base body; and a frame-shaped lid member; the base body including: a receiving part being arranged in an inner periphery of the base body and receiving the gasket and the lid member; and a supporting part extending toward an inner periphery side of the base body and supporting the gasket received in the receiving part in a direction crossing a main face of the membrane; and the lid member having dimensions such that the lid member can be received in the receiving part, wherein the gasket and the lid member are received in the receiving part such that the gasket is sandwiched between the supporting part and the lid member.

10 Claims, 17 Drawing Sheets

(51) Int. Cl.
    *C25B 9/05*     (2021.01)
    *C25B 9/73*     (2021.01)
    *C25B 9/77*     (2021.01)
    *C25B 13/02*     (2006.01)

(56) References Cited

U.S. PATENT DOCUMENTS

| | | |
|---|---|---|
| 4,898,653 A | 2/1990 | Morris |
| 5,795,450 A * | 8/1998 | Hirai .................. C25B 9/77 204/256 |
| 6,309,522 B1 | 10/2001 | Strutt et al. |
| 2006/0042935 A1 | 3/2006 | Houda et al. |
| 2014/0305794 A1 | 10/2014 | Wallevik et al. |
| 2015/0203976 A1 | 7/2015 | Noaki et al. |
| 2016/0153100 A1 | 6/2016 | Nakagawa et al. |

FOREIGN PATENT DOCUMENTS

| | | |
|---|---|---|
| JP | 2002-332586 A | 11/2002 |
| JP | 4453973 B2 | 4/2010 |
| JP | 2015-117417 A | 6/2015 |
| JP | 6093351 B2 | 3/2017 |
| TW | I582270 B | 5/2017 |
| WO | WO2013/191140 A1 | 12/2013 |
| WO | WO2014/178317 A1 | 11/2014 |

* cited by examiner

--Prior Art--

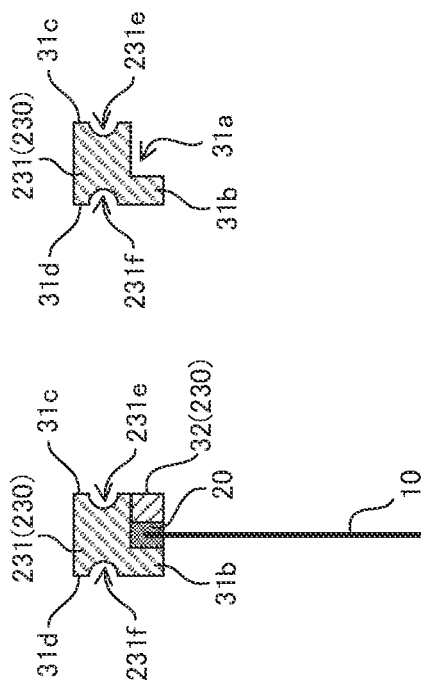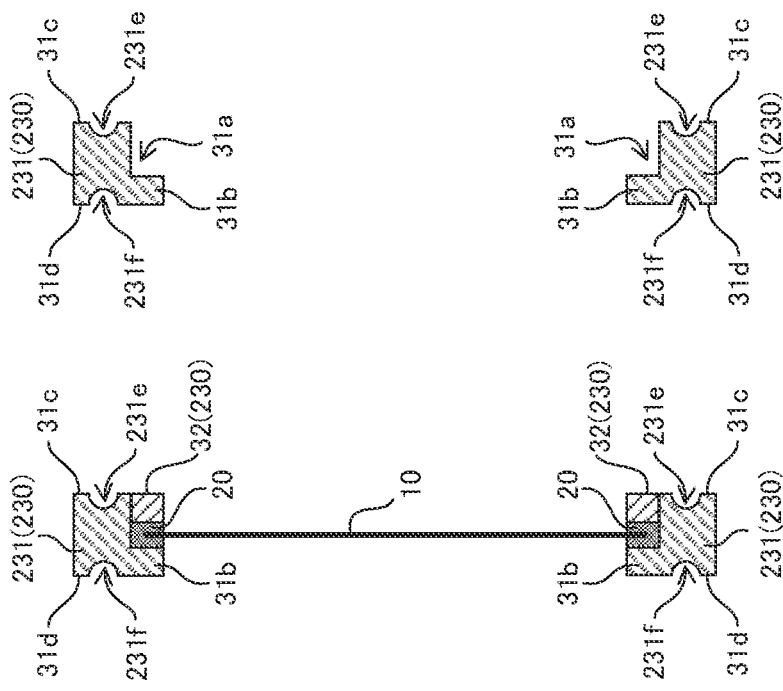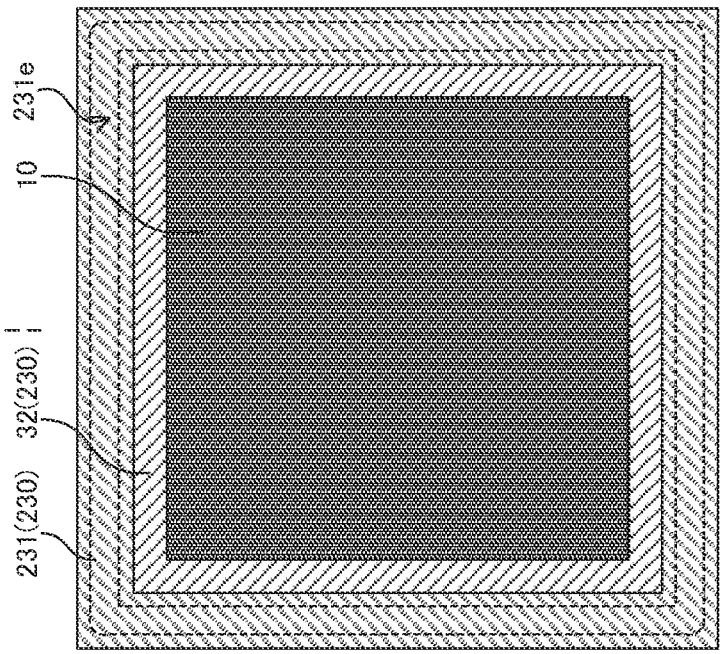

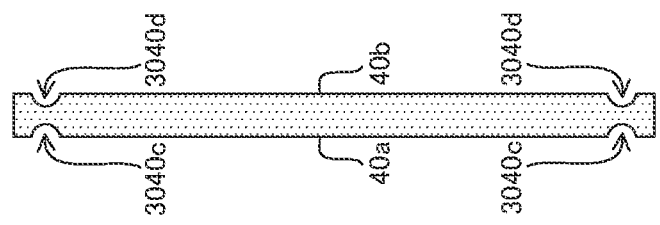
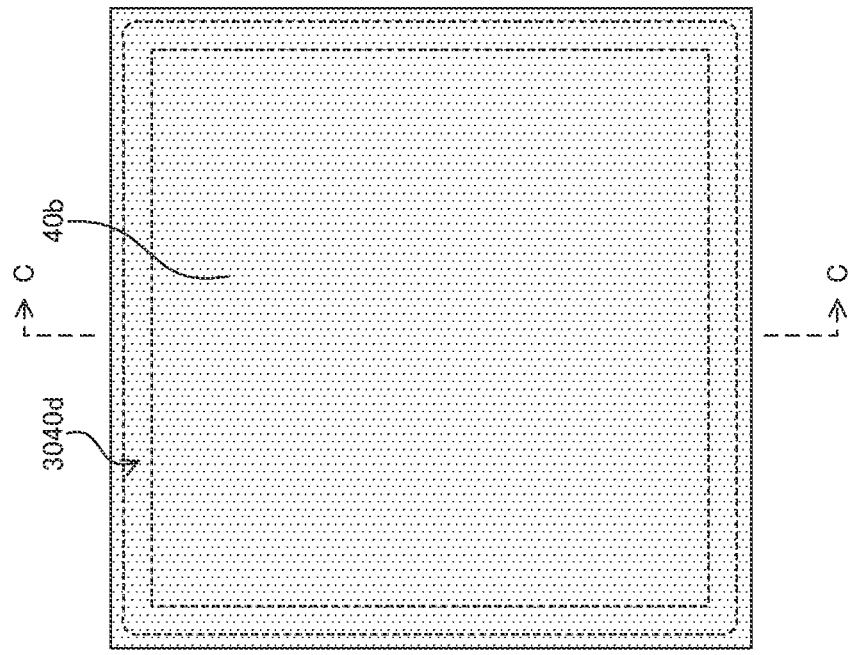
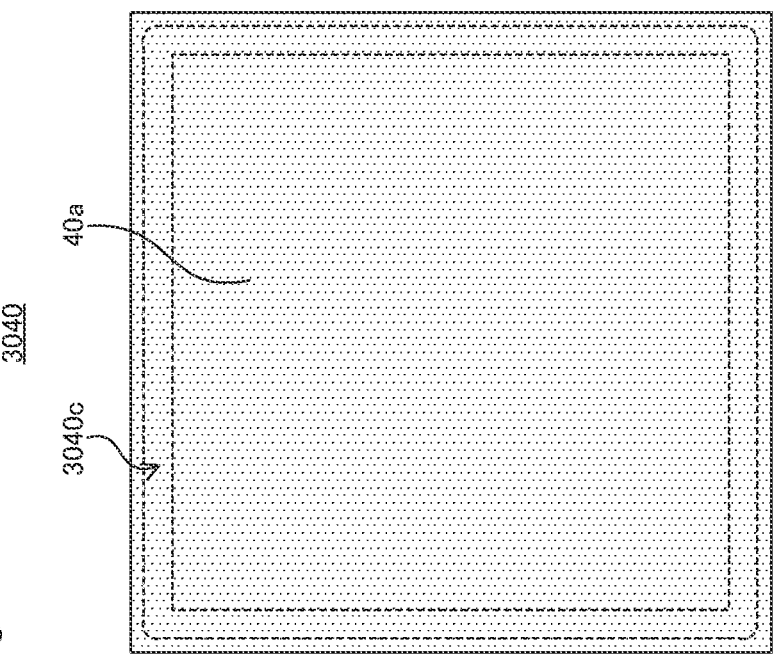

SEPARATOR MEMBRANE-GASKET-PROTECTING MEMBER ASSEMBLY, ELECTROLYSIS ELEMENT, AND ELECTROLYSIS VESSEL

CROSS-REFERENCE TO RELATED APPLICATIONS

This application is a Divisional of copending application Ser. No. 16/979,310, filed on Sep. 9, 2020, which is the National Phase under 35 U.S.C. § 371 of International Application No. PCT/JP2019/010095, filed on Mar. 12, 2019, which claims the benefit under 35 U.S.C. § 119(a) to Patent Application No. 2018-060648, filed in Japan on Mar. 27, 2018, all of which are hereby expressly incorporated by reference into the present application.

TECHNICAL FIELD

The present invention relates to a separating membrane-gasket-protecting member assembly, an electrolysis element, and an electrolysis vessel, and more specifically to a separating membrane-gasket-protecting member assembly, an electrolysis element, and an electrolysis vessel which can be preferably used for alkaline water electrolysis, particularly for alkaline water electrolysis under pressurized conditions.

BACKGROUND ART

The alkaline water electrolysis method is known as a method for producing hydrogen gas and oxygen gas. In the alkaline water electrolysis method, water is electrolyzed using a basic aqueous solution (alkaline water) including a dissolved alkali metal hydroxide (such as NaOH and KOH) as an electrolytic solution, to generate hydrogen gas at a cathode and oxygen gas at an anode. An electrolysis vessel including an anode chamber where an anode is arranged and a cathode chamber where a cathode is arranged is known as an electrolysis vessel for the alkaline water electrolysis: such an electrolysis vessel is partitioned into the anode chamber and the cathode chamber by an ion-permeable separating membrane.

CITATION LIST

Patent Literature

Patent Literature 1: WO 2013/191140 A1
Patent Literature 2: JP 2002-332586 A
Patent Literature 3: JP 4453973 B2
Patent Literature 4: WO 2014/178317 A1
Patent Literature 5: JP 6093351 B2
Patent Literature 6: JP 2015-117417 A

SUMMARY OF INVENTION

Technical Problem

FIG. 1 is a schematically explanatory partial cross-sectional view of a conventional electrolysis vessel for alkaline water electrolysis 900 according to one embodiment. The electrolysis vessel for alkaline water electrolysis 900 includes electrolysis elements (electrode chamber units) 910, 910, ... each including an electroconductive separating wall 911 that separates an anode chamber A and a cathode chamber C, and a flange part 912: each adjacent pair of the electrolysis elements 910, 910, ... includes an ion-permeable separating membrane 920 arranged therebetween; gaskets 930, 930 arranged between the separating membrane 920 and the flange parts 912 of the electrolysis elements 910, 910, between which the periphery of the separating membrane 920 is sandwiched; an anode 940 held by electroconductive ribs 913, 913, ... that protrude from the separating wall 911 of one electrode chamber unit; and a flexible cathode 970 held by a current collector 950 that is held by electroconductive ribs 914, 914, ... that protrude from the separating wall 911 of the other electrolysis element, and an electroconductive elastic body 960 that is arranged in contact with the current collector 950. The periphery of the cathode 970 is fixed to the periphery of the current collector 950, and the periphery of the electroconductive elastic body 960 is also fixed to the periphery of the current collector 950. In each adjacent pair of the electrolysis elements 910, 910, ... in the electrolysis vessel 900, the electroconductive elastic body 960 pushes the flexible cathode 970 toward the separating membrane 920 and the anode 940, which makes the separating membrane 920 sandwiched between the cathode 970 and anode 940.

Gas generated by the alkaline water electrolysis is usually on the market as compressed to have a given pressure. Gas retrieved from a chamber has approximately atmospheric pressure if the pressure inside the chamber is approximately atmospheric pressure, which requires an external compressor outside an electrolysis vessel: the external compressor compresses gas retrieved from the electrolysis vessel at a given pressure. If the pressure in the chamber is higher than atmospheric pressure, a lower capacity of such an external compressor is expected to be enough, or such an external compressor is expected to become unnecessary, which can reduce production costs of gas. It is also considered that the increase in the pressure in the chamber results in smaller air bubbles which are formed in an electrolyte by gas generated in the chamber, which reduces the resistance between electrodes, and thus can reduce electrolysis voltage even if the current density is the same, to achieve energy efficiency.

Disadvantageously, if pressures inside chambers are increased in the conventional electrolysis vessel 900 shown in FIG. 1, pressures inside chambers may deform the gaskets 930, 930 so that the gaskets are thrusted toward the outer periphery sides thereof, and finally the gaskets 930, 930 may be forced out of the position between the flange parts 912, 912 of the electrolysis elements.

So as to prevent problems such as deformation of a gasket, and a gasket's being forced out of position due to the pressure inside a chamber, one may consider using, as an element corresponding to a gasket-separating membrane assembly, an assembly obtained by uniting a rigid core having a shape corresponding to a gasket with a separating membrane into one body, and then coating the core with a flexible and electrically insulating material. In this case, disadvantageously, a process including heating and mechanical pressing is necessary when the core is coated, and when the core is united with the separating membrane into one body. The separating membrane is thus subjected to heat and mechanical pressure which accompany the process, which may deteriorate performance of the separating membrane.

An object of the present invention is to provide a separating membrane-gasket-protecting member assembly, an electrolysis element, and an electrolysis vessel having improved tolerance to pressure inside a chamber while suppressing bad effect due to heat and mechanical pressure applied to a separating membrane.

Solution to Problem

The present invention encompasses the following [1] to [11].

[1] A separating membrane-gasket-protecting member assembly comprising:
an ion-permeable separating membrane;
a gasket holding a periphery of the separating membrane;
a frame-shaped and electrically insulating protecting member holding the gasket;
the protecting member comprising:
   a frame-shaped base body; and
   a frame-shaped lid member;
the base body comprising:
   a receiving part being arranged in an inner periphery of the base body and receiving the gasket and the lid member;
   a supporting part protruding from the receiving part and extending toward an inner periphery side of the base body, and supporting the gasket received in the receiving part in a direction crossing a main face of the separating membrane;
the lid member having dimensions such that the lid member can be received in the receiving part of the base body,
wherein the gasket and the lid member are received in the receiving part of the base body, such that the gasket is sandwiched between the supporting part of the base body and the lid member.

[2] An electrolysis vessel comprising:
a plurality of electroconductive separating wall each having a first face and a second face, wherein each adjacent pair of the electroconductive separating walls comprising a first electroconductive separating wall and a second electroconductive separating wall is arranged such that the first face of the first electroconductive separating wall faces the second face of the second electroconductive separating wall;
a plurality of the separating membrane-gasket-protecting member assembly as defined in [1] each arranged between each adjacent pair of the electroconductive separating walls; and
sealing members each arranged between each adjacent pair of the electroconductive separating wall and the separating membrane-gasket-protecting member assembly;
each adjacent pair of the first face of the electroconductive separating wall and the separating membrane facing the first face of the electroconductive separating wall defining a first chamber therebetween, the first chamber comprising a first electrode arranged therein and electrically connected with the electroconductive separating wall of the pair defining the first chamber; and
each adjacent pair of the second face of the electroconductive separating wall and the separating membrane facing the second face of the electroconductive separating wall defining a second chamber therebetween, the second chamber comprising a second electrode arranged therein and electrically connected with the electroconductive separating wall of the pair defining the second chamber.

[3] The electrolysis vessel according to [2],
wherein the sealing members are O-rings; and
each of the protecting members comprising:
   a first groove provided in a first face of the frame-shaped base body, such that the O-ring can be fixed between the frame-shaped base body and the first face of the electroconductive separating wall, the first face of the frame-shaped base body facing the first face of the electroconductive separating wall; and
   a second groove provided in a second face of the frame shaped body, such that the O-ring can be fixed between the frame-shaped base body and the second face of the electroconductive separating wall, the second face of the frame-shaped base body facing the second face of the electroconductive separating wall.

[4] The electrolysis vessel according to [2],
wherein the sealing members are O-rings; and
each of the electroconductive separating walls comprising:
   a first groove provided in the first face of the electroconductive separating wall, such that the O-ring can be fixed between the first face of the electroconductive separating wall and the frame-shaped base body; and
   a second groove provided in the second face of the electroconductive separating wall, such that the O-ring can be fixed between the second face of the electroconductive separating wall and the frame-shaped base body.

[5] An electrolysis element comprising:
an ion-permeable separating membrane;
a gasket holding a periphery of the separating membrane;
a frame-shaped protecting member holding the gasket; and
an electroconductive separating wall having a first face and a second face;
the protecting member comprising:
   a frame-shaped base body; and
   a frame-shaped lid member;
the base body comprising:
   a receiving part arranged in an inner periphery of the base body and receiving the gasket and the lid member; and
   a supporting part protruding from the receiving part and extending toward an inner periphery side of the base body, and supporting the gasket received in the receiving part in a direction crossing a main face of the separating membrane;
the lid member having dimensions such that the lid member can be received in the receiving part of the base body,
wherein the gasket and the lid member are received in the receiving part of the base body, such that the gasket is sandwiched between the supporting part of the base body and the lid member;
the electroconductive separating wall is arranged such that the first face of the electroconductive separating wall faces the separating membrane;
an outer periphery of the electroconductive separating wall is joined with an inner periphery of the supporting part of the base body, or is united with the inner periphery of the supporting part of the base body into one body;
the frame-shaped base body comprises a protruding flange part being continuous with the supporting part and protruding from the outer periphery of the electroconductive separating wall toward a side of the second face of the electroconductive separating wall; and
an outer periphery of the protruding flange part has dimensions smaller than or equal to dimensions of an inner periphery of the receiving part.

[6] An electrolysis vessel comprising:
a stacked structure comprising a plurality of the electrolysis element as defined in [5] being stacked, wherein for each adjacent pair of the electrolysis elements comprising a first electrolysis element and a second electrolysis element, at least part of the protruding flange part of the first electrolysis element is further received in the receiving part of the second electrolysis element, such that the protruding flange part of the first electrolysis element and the supporting part of the second electrolysis element sandwich the gasket and the lid member of the second electrolysis element, to hold the gasket and the lid member of the second electrolysis element therebetween;
each adjacent pair of the first face of the electroconductive separating wall and the separating membrane facing the first face of the electroconductive separating wall defining a first chamber therebetween, the first chamber comprising a first electrode arranged therein and electrically connected with the electroconductive separating wall of the pair defining the first chamber; and
each adjacent pair of the second face of the electroconductive separating wall and the separating membrane facing the second face of the electroconductive separating wall defining a second chamber therebetween, the second chamber comprising a second electrode arranged therein and electrically connected with the electroconductive separating wall of the pair defining the second chamber.

[7] The electrolysis vessel according to [6], wherein for each adjacent pair of the electrolysis elements comprising the first electrolysis element and the second electrolysis element, the protruding flange part of the first electrolysis element and the lid member of the second electrolysis element sandwich an O-ring as a sealing member, to hold the O-ring therebetween.

[8] The electrolysis vessel according to [6] or [7], the stacked structure comprising a third electrolysis element arranged at a first end of the stacked structure and a fourth electrolysis element arranged at a second end of the stacked structure;
the electrolysis vessel further comprising:
a first terminal element arranged such that the first terminal element faces the second face of the electroconductive separating wall of the third electrolysis element; and
a second terminal element arranged such that the second terminal element faces the separating membrane of the fourth electrolysis element;
the first terminal element comprising:
an ion-permeable first separating membrane;
a first gasket holding a periphery of the first separating membrane;
a frame-shaped first protecting member holding the first gasket; and
a third electroconductive separating wall having a first face and a second face;
the first protecting member comprising:
a frame-shaped first base body; and
a frame-shaped first lid member;
the first base body comprising:
a first receiving part arranged in an inner periphery of the first base body and receiving the first gasket and the first lid member; and
a first supporting part protruding from the first receiving part and extending toward an inner periphery side of the first base body, and supporting the first gasket received in the first receiving part in a direction crossing a main face of the first separating membrane;
the first lid member having dimensions such that the first lid member can be received in the first receiving part of the first base body;
the first gasket and the first lid member being received in the first receiving part of the first base body, such that the first gasket is sandwiched between the first supporting part and the first lid member;
the third electroconductive separating wall being arranged such that the first face of the third electroconductive separating wall faces the first separating membrane;
an outer periphery of the third electroconductive separating wall being joined with an inner periphery of the first supporting part of the first base body, or being united with the inner periphery of the first supporting part of the first base body into one body;
at least part of the protruding flange part of the third electrolysis element being further received in the first receiving part of the first terminal element, such that the protruding flange part of the third electrolysis element and the first supporting part of the first terminal element sandwich the first gasket and the first lid member of the first terminal element, to hold the first gasket and the first lid member of the first terminal element therebetween;
the second terminal element comprising:
a fourth electroconductive separating wall having a first face and a second face; and
a second protruding flange part being joined with an outer periphery of the fourth electroconductive separating wall or being united with the outer periphery of the fourth electroconductive separating wall into one body, wherein a first end of the second protruding flange part protrudes from the outer periphery of the fourth electroconductive separating wall and extends toward a side of the second face of the fourth electroconductive separating wall;
an outer periphery of the second protruding flange part having dimensions smaller than or equal to the dimensions of the inner periphery of the receiving part of the fourth electrolysis element, at least at the first end of the second protruding flange part;
at least part of the second protruding flange part of the second terminal element being further received in the receiving part of the fourth electrolysis element, such that the second protruding flange part of the second terminal element and the supporting part of the fourth electrolysis element sandwich the gasket and the lid member of the fourth electrolysis element, to hold the gasket and the lid member of the fourth electrolysis element therebetween;
the first face of the third electroconductive separating wall of the first terminal element and the first separating membrane further defining another first chamber therebetween, the another first chamber comprising another first electrode arranged therein and electrically connected with the third electroconductive separating wall;
the second face of the electroconductive separating wall of the third electrolysis element and the first separating membrane of the first terminal element further defining another second chamber therebetween, the another second chamber comprising another second electrode arranged therein and electrically connected with the electroconductive separating wall of the third electrolysis element; and
the second face of the fourth electroconductive separating wall of the second terminal element and the separating membrane of the fourth electrolysis element further defining yet another second chamber therebetween, the yet another second chamber comprising yet another second electrode arranged therein and electrically connected with the fourth electroconductive separating wall.

[9] The electrolysis vessel according to [8], the protruding flange part of the third electrolysis element and the first lid member of the first terminal element sandwiching a first O-ring as a sealing member, to hold the first O-ring therebetween; and the second protruding flange part of the second terminal element and the lid member of the fourth electrolysis element sandwiching a second O-ring as a sealing member, to hold the second O-ring therebetween.

[10] The electrolysis vessel according to any one of [6] to [9], wherein the frame-shaped first base body of the first terminal element, the second protruding flange part of the second terminal element, and each of the frame-shaped base bodies of the electrolysis elements are electrically insulating.

[11] The electrolysis vessel according to any one of [6] to [9], the frame-shaped first base body of the first terminal element, the second protruding flange part of the second terminal element, and each of the frame-shaped base bodies of the electrolysis elements each comprising an electroconductive material;

the electrolysis vessel further comprising:

a first electrical insulating member arranged such that the first electrical insulating member prevents short-circuiting between the frame-shaped first base body of the first terminal element and the frame-shaped base body of the third electrolysis element;

a second electrical insulating member arranged such that the second electrical insulating member prevents short-circuiting between the second protruding flange part of the second terminal element and the frame-shaped base body of the fourth electrolysis element; and a third electrical insulating member arranged such that the third electrical insulating member prevents short-circuiting between the frame-shaped base bodies of each adjacent pair of the electrolysis elements.

Advantageous Effects of Invention

In the separating membrane-gasket-protecting member assembly of the present invention, the separating membrane, the gasket, and the lid member are received in the receiving part of the frame-shaped base body, such that the separating membrane and the gasket are sandwiched between and held by the supporting part of the base body and the lid member. Heating or mechanical pressing when uniting the separating membrane and the protecting member into one body is thus unnecessary. Thus, an electrolysis vessel including the separating membrane-gasket-protecting member assembly of the present invention can improve tolerance to pressures inside chambers while suppressing bad effect due to heat and mechanical pressure applied to the separating membrane.

In the electrolysis element of the present invention, the separating membrane, the gasket, and the lid member are received in the receiving part of the frame-shaped base body, such that the separating membrane and the gasket are sandwiched between and held by the supporting part of the base body and the lid member. Heating or mechanical pressing when uniting the separating membrane and the protecting member into one body is thus unnecessary. Further, the frame-shaped base body includes the protruding flange part being continuous with the supporting part and protruding from the outer periphery of the electroconductive separating wall toward the side of the second face of the electroconductive separating wall, and the outer periphery of the protruding flange part has dimensions smaller than or equal to those of the inner periphery of the receiving part, which allow the outer periphery of the protruding flange part of one electrolysis element to be further received in the receiving part of another electrolysis element that is adjacent to the one electrolysis element at least at an end of the protruding flange part, in an electrolysis vessel having a stacked structure including a plurality of the electrolysis element of the present invention being stacked. Thus, the gasket and the lid member are sandwiched between and held by the protruding flange part of the one electrolysis element and the supporting part of the other electrolysis element, which makes it possible to unite the separating membrane and the gasket with the electrolysis element into one body with a simple structure. In addition, since the receiving part receiving the gasket is arranged in the inner periphery of the frame-shaped base body, deformation of the gasket due to pressures inside chambers is restricted by the inner periphery of the receiving part. Thus, the electrolysis vessel having a stacked structure including a plurality of the electrolysis element of the present invention being stacked can improve tolerance to pressures inside chambers while suppressing bad effect due to heat and mechanical pressure applied to the separating membrane.

BRIEF DESCRIPTION OF DRAWINGS

FIG. 2A is a plan view of the assembly 100; FIG. 2B is a cross-sectional view taken along the arrows B-B in FIG. 2A; FIG. 2C is a cross-sectional view showing a position where a lid member 32 is detached in FIG. 2B; and FIG. 2D is a cross-sectional view showing a position where a separating membrane 10 and a gasket 20 are further detached in FIG. 2(C).

FIGS. 5A to 5C are schematically explanatory views of a separating membrane-gasket-protecting member assembly 200 according to another embodiment of the present invention: FIG. 5A is a plan view of the assembly 200: FIG. 5B is a cross-sectional view taken along the arrows B-B in FIG. 5A; and FIG. 5C shows that only a base body 231 is taken out in FIG. 5B.

FIGS. 7A to 7C are schematically explanatory views of an electroconductive separating 3040: FIG. 7A is a plan view of the electroconductive separating wall 3040; FIG. 7B is a bottom view of the electroconductive separating wall 3040; and FIG. 7C is a cross-sectional view taken along the arrows C-C in FIG. 7B.

FIG. 8A is a cross-sectional view of the electrolysis element 500; and FIG. 8B shows that the separating membrane 10, the gasket 20, and a lid member 532 are removed in FIG. 8A.

FIG. 9A is a cross-sectional view of the electrolysis element 500'; and FIG. 9B shows that the separating membrane 10, the gasket 20, and the lid member 532 are removed in FIG. 9A.

FIG. 10A is a cross-sectional view of the electrolysis element 500"; and FIG. 10B shows that the separating membrane 10, the gasket 20, and the lid member 532 are removed in FIG. 10A.

FIG. 12A is a cross-sectional view of the first terminal element 4500; and FIG. 12B shows that the separating membrane 10, the gasket 20, and the lid member 532 are removed in FIG. 12A.

FIG. 17A is a cross-sectional view of the first terminal element 4500"; and FIG. 17B shows that the separating membrane 10, the gasket 20, and the lid member 532 are removed in FIG. 17A.

DESCRIPTION OF EMBODIMENTS

Figure 1:
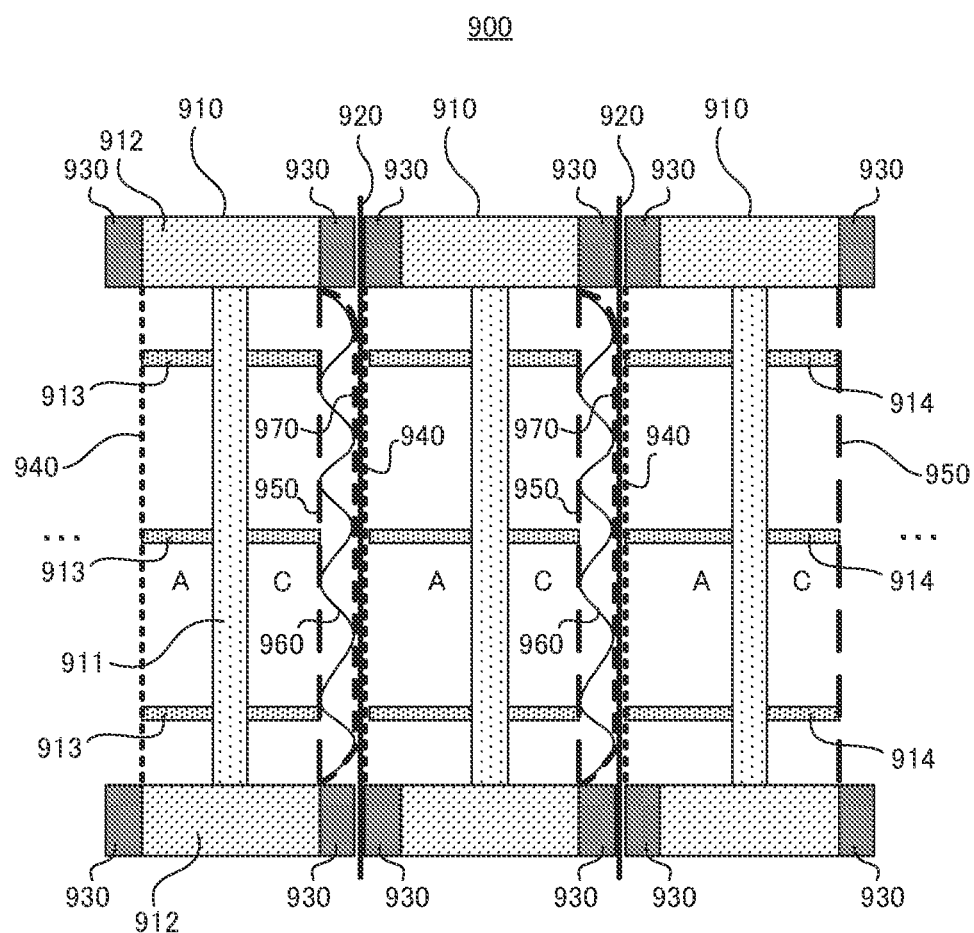
FIG. 1 is a schematically explanatory cross-sectional view of the conventional electrolysis vessel for alkaline water electrolysis 900 according to one embodiment.

The above described effects and advantages of the present invention will be made clear from the following description of the embodiments. Hereinafter the embodiments of the present invention will be described with reference to the drawings. The present invention is not limited to these embodiments. The dimensions in the drawings do not always represent exact dimensions. Some reference signs may be omitted in the drawings. In the present description, expression "A to B" concerning numeral values A and B means "no less than A and no more than B" unless otherwise specified. In such expression, if a unit is added only to the numeral value B, this unit is applied to the numeral value A as well. A word "or" means a logical sum unless otherwise specified.

<1. Separating Membrane-Gasket-Protecting Member Assembly>

Figure 2B:
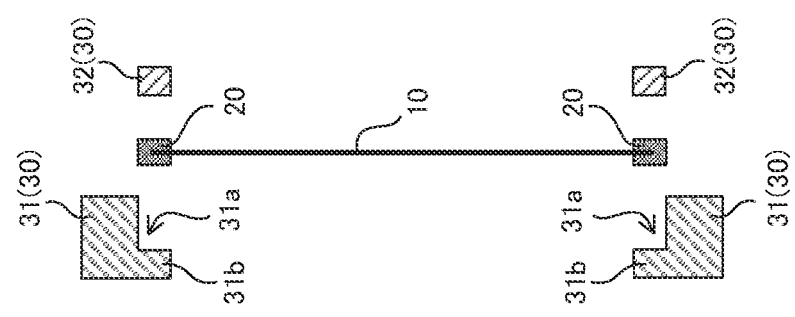
FIGS. 2A to 2D are schematically explanatory views of a separating membrane-gasket-protecting member assembly 100 according to one embodiment of the present invention.
Figure 2C:
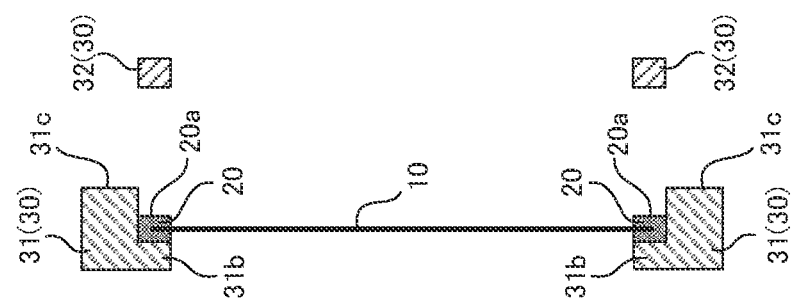
Figure 2D:
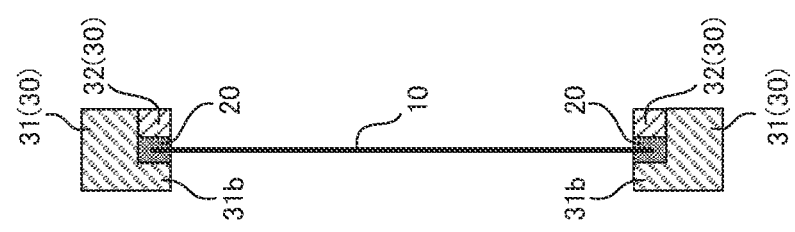
Figure 2A:
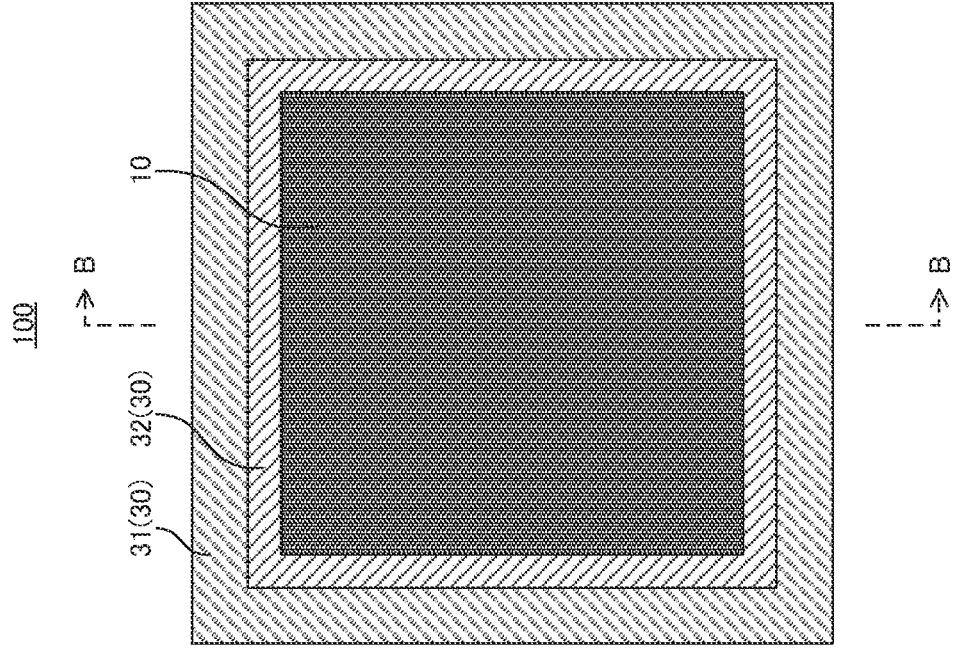

FIGS. 2A to 2D are schematically explanatory views of a separating membrane-gasket-protecting member assembly 100 (hereinafter may be simply referred to as "assembly 100") according to one embodiment of the present invention. FIG. 2A is a plan view of the assembly 100, FIG. 2B is a cross-sectional view taken along the arrows B-B in FIG. 2A, and FIGS. 2C and 2D are cross-sectional views each showing a position where the assembly 100 is disassembled. The assembly 100 includes: an ion-permeable separating membrane 10; a gasket 20 holding the periphery of the separating membrane 10; and a frame-shaped and electrically insulating protecting member 30 holding the gasket 20. The protecting member 30 includes: a frame-shaped base body 31; and a frame-shaped lid member 32. The base body 31 includes: a receiving part 31a being arranged in the inner periphery of the base body 31 and receiving the gasket 20 (holding the separating membrane 10) and the lid member 32; and a supporting part 31b protruding from the receiving part 31a and extending toward the inner periphery side of the base body 31, and supporting the gasket 20 received in the receiving part 31a in the direction crossing the main face of the separating membrane 10 (direction across the sheet of FIGS. 2B to 2D between left and right, which may be hereinafter referred to as "stacking direction") (FIG. 2D).

FIG. 2C is a cross-sectional view showing a position where the gasket 20 is received in the receiving part 31a of the base body 31 and supported by the supporting part 31b in the direction crossing the main face of the separating membrane 10. The receiving part 31a has a depth larger than the thickness of the gasket 20 holding the periphery of the separating membrane 10, in the stacking direction. Thus, when the gasket 20 holding the separating membrane 10 is received in the receiving part 31a and supported by the supporting part 31b in the stacking direction, a difference in levels is formed between a face 20a of the gasket 20 received in the receiving part 31a which is on the opposite side of the supporting part 31b, and a face 31c of the base body 31 which is on the opposite side of the supporting part 31b (FIG. 2C). The lid member 32 has dimensions such that the lid member 32 can be received in the difference between the face 31c of the base body 31 including the receiving part 31a, which receives the gasket 20, and the face 20a of the gasket 20. That is, the outer periphery of the lid member 32 has approximately the same dimensions as the inner periphery of the receiving part 31a of the base body 31, the inner periphery of the lid member 32 has approximately the same dimensions as the inner periphery of the supporting part 31b of the base body 31, and the thickness of the lid member 32 is such that the total of the thickness of the gasket 20 holding the separating membrane 10 and the thickness of the lid member 32 is approximately the same as the depth of the receiving part 31a of the base body 31, in the stacking direction. FIG. 2B is a cross-sectional view showing a position where the lid member 32 is received in the difference between the face 31c of the base body 31 and the face 20a of the gasket 20 in FIG. 2C. As shown in FIG. 2B, the gasket 20 and the lid member 32 are received in the receiving part 31a of the base body 31, such that the gasket 20 is sandwiched between and held by the supporting part 31b of the base body 31 and the lid member 32.

As the separating membrane 10, any ion-permeable separating membrane that can be used for electrolysis vessels for alkaline water electrolysis may be used without particular limitations. The separating membrane 10 desirably has low gas permeability, low electric conductivity, and high strength. Examples of the separating membrane 10 include a porous separating membrane such as a porous membrane formed of asbestos and of modified asbestos, a porous separating membrane using a polysulfone-based polymer, a cloth using a polyphenylene sulfide fiber, a fluorinated porous membrane, and a porous membrane using a hybrid material including both inorganic and organic materials. Other than these porous separating membranes, an ion-exchange membrane such as a fluorinated ion-exchange membrane can be used as the separating membrane 10.

Any gasket that can be used for electrolysis vessels for alkaline water electrolysis may be used as the gasket 20 without particular limitations. FIGS. 2B to 2D show a cross section of the gasket 20. The gasket 20 has a flat shape, holds the periphery of the separating membrane 10, and at the same time is sandwiched between and held by the supporting part 31b of the base body 31 and the lid member 32 in the receiving part 31a of the base body 31. The gasket 20 is preferably formed of an alkali-resistant elastomer. Examples of the material of the gasket 20 include elastomers such as natural rubber (NR), styrene-butadiene rubber (SBR), polychloroprene (CR), butadiene rubber (BR), acrylonitrile-butadiene rubber (NBR), ethylene propylene rubber (EPT), ethylene propylene diene monomer rubber (EPDM), isobutylene isoprene rubber (IIR), and chlorosulfonated polyethylene rubber (CSM). When a gasket material that is not alkali-resistant is used, a layer of an alkali-resistant material may be arranged over the surface of the gasket material by coating or the like.

The base body 31 is preferably electrically insulating against voltage application from the outside. In one embodiment, the base body 31 is formed of an electrically insulating material. As the electrically insulating material forming the base body 31, an alkali-resistant resin material having strength enough to bear a pressing force applied in the stacking direction can be preferably used. Preferred examples of such a resin material include a rigid polyvinyl chloride resin, a polypropylene resin, a polyethylene resin, a polyetherimide resin, a polyphenylenesulfide resin, a polybenzimidazole resin, a polytetrafluoroethylene resin, a tetrafluoroethylene-perfluoroalkyl vinyl ether copolymer resin, and a tetrafluoroethylene-ethylene copolymer resin. In another embodiment, the base body 31 includes a core made from a metallic material, and a coating layer of an electrically insulating material which coats the surface of the core. Examples of the metallic material forming the core of the base body 31 include rigid metallic materials such as simple metals including iron, and stainless steel including SUS304. Preferred examples of the electrically insulating material forming the coating layer of the base body 31 include the above described electrically insulating resin materials, and electrically insulating and alkali-resistant elastomers. Preferred examples of such an elastomer include natural rubber (NR), styrene-butadiene rubber (SBR), polychloroprene (CR), butadiene rubber (BR), acrylonitrile-butadiene rubber (NBR), ethylene propylene rubber (EPT), ethylene propylene diene monomer rubber (EPDM), isobutylene isoprene rubber (IIR), and chlorosulfonated polyethylene rubber (CSM). When an elastomer that is not alkali-resistant is used, a layer of an alkali-resistant material may be arranged over the surface of this elastomer by coating or the like.

The lid member 32 may be made from a metal, or may be formed of an electrically insulating material. Examples of the metallic material forming the lid member 32 include metallic materials same as those described above concerning the base body 31. In one embodiment, the lid member 32 is formed of an electrically insulating material. Preferred examples of the electrically insulating material forming the lid member 32 include resin materials same as those described above concerning the base body 31. In another embodiment, the lid member 32 includes a core made from a metallic material, and a coating layer of an electrically insulating material which coats the surface of the core. Examples of the metallic material forming the core of the lid member 32 include rigid metallic materials same as those described above concerning the core of the base body 31. Preferred examples of the electrically insulating material forming the coating layer of the lid member 32 include resin materials and elastomers same as those described above concerning the coating layer of the base body 31.

<2. Electrolysis Vessel (1)>

Figure 3:
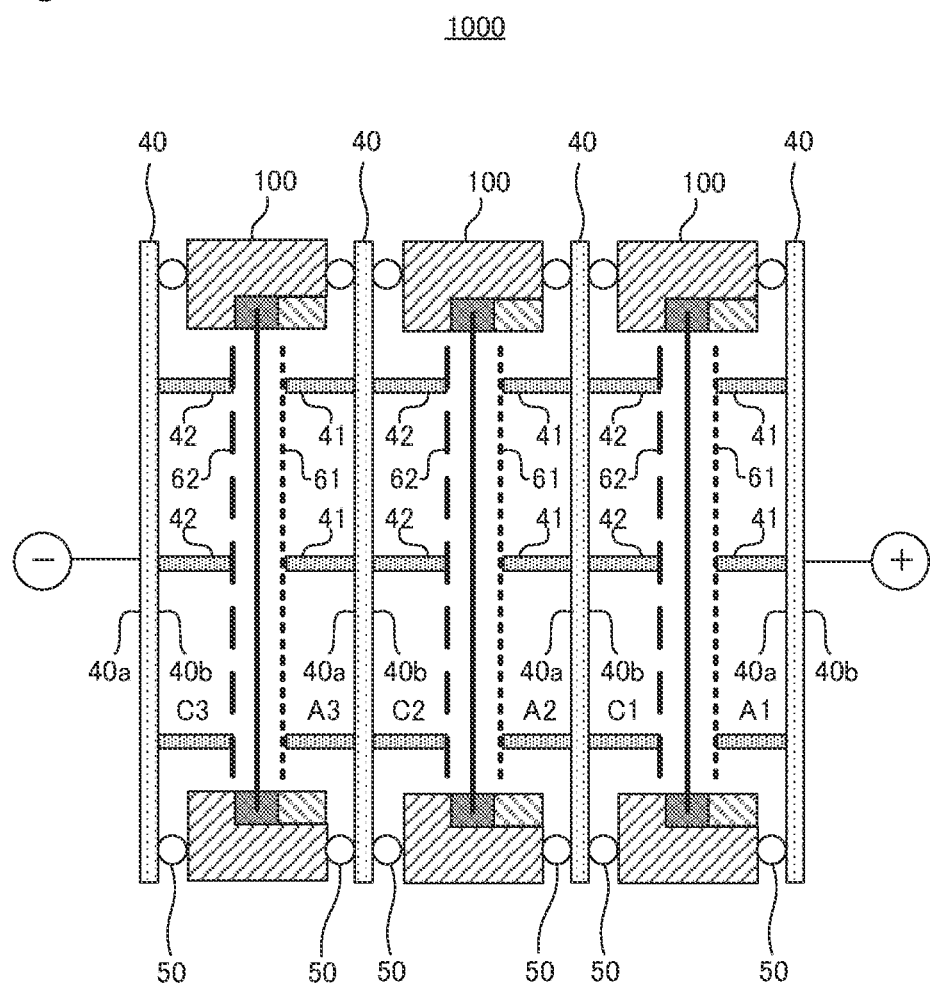
FIG. 3 is a schematically explanatory cross-sectional view of an electrolysis vessel 1000 according to one embodiment of the present invention.

FIG. 3 is a schematically explanatory cross-sectional view of an electrolysis vessel 1000 according to one embodiment of the present invention. The electrolysis vessel 1000 is an electrolysis vessel for alkaline water electrolysis. In FIG. 3, the elements already shown in FIGS. 2A to 2D are given the same reference signs as in FIGS. 2A to 2D, and the description thereof may be omitted. The electrolysis vessel 1000 includes a plurality of electroconductive separating wall 40, 40, . . . (hereinafter may be simply referred to as "electroconductive separating walls 40") each having a first face 40a and a second face 40b, a plurality of the separating membrane-gasket-protecting member assembly 100, 100, . . . (see FIGS. 2A to 2D) each arranged between adjacent pairs of the electroconductive separating walls 40, 40; and sealing members 50, 50, . . . (hereinafter may be simply referred to as "sealing members 50") each arranged between the electroconductive separating walls 40, 40, . . . and the assemblies 100, 100, . . . respectively adjacent to the electroconductive separating walls 40, 40, . . . .

In the electrolysis vessel 1000, each adjacent pair of the electroconductive separating walls 40, 40 is arranged so that the first face 40a of one electroconductive separating wall 40 faces the second face 40b of the other electroconductive separating wall 40. In the electrolysis vessel 1000, the first face 40a of each of the electroconductive separating walls 40 and the separating membrane 10 facing this first face 40a (see FIGS. 2A to 2D) define therebetween a first chamber (anode chamber A1, A2, A3) including a first electrode (anode) 61 arranged therein and electrically connected with the electroconductive separating wall 40 having this first face 40a; and the second face 40b of each of the electroconductive separating walls 40 and the separating membrane 10 facing this second face 40b (see FIGS. 2A to 2D) define therebetween a second chamber (cathode chamber C1, C2, C3) including a second electrode (cathode) 62 arranged therein and electrically connected with the electroconductive separating wall 40 having this second face 40b. An anode terminal is connected to one of the electroconductive separating walls 40, which defines only one first chamber (that is, the electroconductive separating wall 40, whose second face 40b does not face any second chamber), and the anode terminal is connected to a cathode of a DC power supply. A cathode terminal is connected to one of the electroconductive separating walls 40, which defines only one second chamber (that is, the electroconductive separating wall 40, whose first face 40a does not face any first chamber), and the cathode terminal is connected to an anode of the DC power supply. The electrolysis vessel 1000 further includes a first electrolyte supply flow path (not shown) supplying an electrolyte to each of the first chambers (anode chambers A1, A2, A3), a first electrolyte and gas retrieving flow path (not shown) retrieving the electrolyte and gas from each of the first chambers, a second electrolyte supply flow path (not shown) supplying the electrolyte to each of the second chambers (C1, C2, C3), and a second electrolyte and gas retrieving flow path (not shown) retrieving the electrolyte and gas from each of the second chambers.

Each of the first electrodes (anodes) 61 is held by electroconductive ribs 41, 41, . . . (hereinafter may be simply referred to as "electroconductive ribs 41") being arranged so that the electroconductive ribs 41 protrude from the first faces 40a of some of the electroconductive separating walls 40 which define the first chambers (anode chambers A1, A2, and A3) including the first electrodes 61 arranged therein. The electroconductive ribs 41 are electrically connected with the electroconductive separating walls 40 and the first electrodes 61. Each of the second electrodes (cathodes) 62 is held by electroconductive ribs 42, 42, . . . (hereinafter may be simply referred to as "electroconductive ribs 42") being arranged so that the electroconductive ribs 42 protrude from the second faces 40b of some of the electroconductive separating walls 40 which define the second chambers (cathode chamber C1, C2, and C3) including the second electrodes 62 arranged therein. The electroconductive ribs 42 are electrically connected with the electroconductive separating walls 40 and the second electrodes 62.

Any alkali-resistant rigid electroconductive material can be used as the material of the electroconductive separating walls 40 without particular limitations. For example, a metallic material such as simple metals including nickel and iron, and stainless steel including SUS304, SUS310, SUS310S, SUS316, and SUS316L can be preferably employed. These metallic materials may be nickeled to use for improving corrosion resistance and electroconductivity.

Each of the sealing member 50 is held between the protecting members 31 of the assemblies 100, and the electroconductive separating walls 40. Each of the sealing member 50 receives a pressing force between the protecting members 31 and the electroconductive separating walls 40, so as to prevent the electrolyte or gas from leaking out of between the protecting members 31 and the electroconductive separating walls 40 due to the internal pressure of each chamber. The sealing members 50 are preferably formed of an alkali-resistant elastomer. Examples of the material of the sealing members 50 include elastomers such as natural rubber (NR), styrene-butadiene rubber (SBR), polychloroprene (CR), butadiene rubber (BR), acrylonitrile-butadiene rubber (NBR), ethylene propylene rubber (EPT), ethylene propylene diene monomer rubber (EPDM), isobutylene isoprene rubber (IIR), and chlorosulfonated polyethylene rubber (CSM). When an elastomer that is not alkali-resistant is used as the sealing members 50, a layer of an alkali-resistant material may be arranged over the surface of a core including such an elastomer by coating or the like. The sealing members 50 are O-rings. The use of O-rings as the sealing members can further improve the pressure resistance of the electrolysis vessel 1000.

Any anode that may be used for electrolysis vessels for alkaline water electrolysis may be used as the anodes (first electrodes) 61 without particular limitations. Each of the anode 61 usually includes an electroconductive base material, and a catalyst layer covering the surface of the base material. The catalyst layer is preferably porous. As the electroconductive base material for the anodes 61, for example, nickel, a nickel alloy, ferronickel, vanadium, molybdenum, copper, silver, manganese, a platinum group metal, graphite, or chromium, or any combination thereof may be preferably used. In the anodes 61, an electroconductive base material formed of nickel can be preferably used. The catalyst layer includes nickel as an element. The catalyst layer preferably includes nickel oxide, metallic nickel or nickel hydroxide, or any combination thereof, and may include an alloy of nickel and at least one other metal. The catalyst layer is especially preferably formed of metallic nickel. The catalyst layer may further include chromium, molybdenum, cobalt, tantalum, zirconium, aluminum, zinc, a platinum group metal, or a rare earth element, or any combination thereof. Rhodium, palladium, iridium, or ruthenium, or any combination thereof may be further supported on the surface of the catalyst layer as an additional catalyst.

The electroconductive base material for the anodes 61 may be a rigid base material, or may be a flexible base material. Examples of the rigid electroconductive base material forming the anodes 61 include expanded metals and punching metals. Examples of the flexible electroconductive base material forming the anodes 61 include gauze woven (or knitted) out of metal wire.

Any cathode that may be used for electrolysis vessels for alkaline water electrolysis may be used as the cathodes (second electrodes) 62 without particular limitations. Each of the cathodes 62 usually includes an electroconductive base material, and a catalyst layer covering the surface of the base material. As the electroconductive base material for the cathodes 62, for example, nickel, a nickel alloy, stainless steel, mild steel, a nickel alloy, nickeled stainless steel, or nickeled mild steel can be preferably employed. As the catalyst layer for the cathodes 62, a catalyst layer formed of a noble metal oxide, nickel, cobalt, molybdenum, or manganese, or an oxide or a noble metal oxide thereof can be preferably used. The electroconductive base material forming the cathodes 62 may be, for example, a rigid base material, or may be a flexible base material. Examples of the rigid electroconductive base material forming the cathodes 62 include expanded metals and punching metals. Examples of the flexible electroconductive base material forming the cathodes 62 include gauze woven (or knitted) out of metal wire.

As the electroconductive ribs 41 and the electroconductive ribs 42, any known electroconductive ribs used for electrolysis vessels for alkaline water electrolysis may be used without particular limitations. In the electrolysis vessel 1000, the electroconductive ribs 41 protrude from the first faces 40a of some of the electroconductive separating walls 40, and the electroconductive ribs 42 protrude from the second faces 40b of some of the electroconductive separating walls 40. The connecting way, shape, number, and arrangement of the electroconductive ribs 41 are not particularly limited as long as the electroconductive ribs 41 can fix the anodes 61 to the electroconductive separating walls 40 to hold the anodes 61. The connecting way, shape, number, and arrangement of the electroconductive ribs 42 are not particularly limited either as long as the electroconductive ribs 42 can fix the cathodes 62 to the electroconductive separating walls 40 to hold the cathodes 62. For the material for the electroconductive ribs 41 and the electroconductive ribs 42, any alkali-resistant rigid electroconductive material may be used without particular limitations, and for example, a metallic material such as simple metals including nickel and iron, and stainless steel including SUS304, SUS310, SUS310S, SUS316, and SUS316L can be preferably employed. These metallic materials may be nickeled for improving corrosion resistance and electroconductivity.

Since the electrolysis vessel 1000 includes the separating membrane-gasket-protecting member assemblies 100 of the present invention, the electrolysis vessel 1000 can improve tolerance to pressures inside chambers while bad effect due to heat and mechanical pressure that the separating membranes receive is suppressed.

In the foregoing description concerning the present invention, the electrolysis vessel 1000 including the assemblies 100 such that a side of each assembly where the lid member 32 is included faces the first chambers (anode chambers) has been described as an example. The present invention is not limited to this embodiment. For example, the electrolysis vessel can include the assemblies 100 such that a side of each assembly where the lid member 32 is included faces the second chambers (cathode chambers).

In the foregoing description concerning the present invention, the electrolysis vessel 1000 including the sealing members 50 that are O-rings has been described as an example. The present invention is not limited to this embodiment. For example, the electrolysis vessel can include sealing members that are flat gaskets instead of the sealing members 50 that are O-rings. In view of improving tolerance to pressures inside chambers of the electrolysis vessel 1000, the sealing members 50 that are O-rings are preferably used.

In the foregoing description concerning the present invention, the electrolysis vessel 1000 including the assemblies 100 that do not have any groove to fix the sealing members 50 has been described as an example. The present invention is not limited to this embodiment. For example, the electrolysis vessel can include a separating membrane-gasket-protecting member assembly having a groove to fix the sealing members 50.

Figure 4:
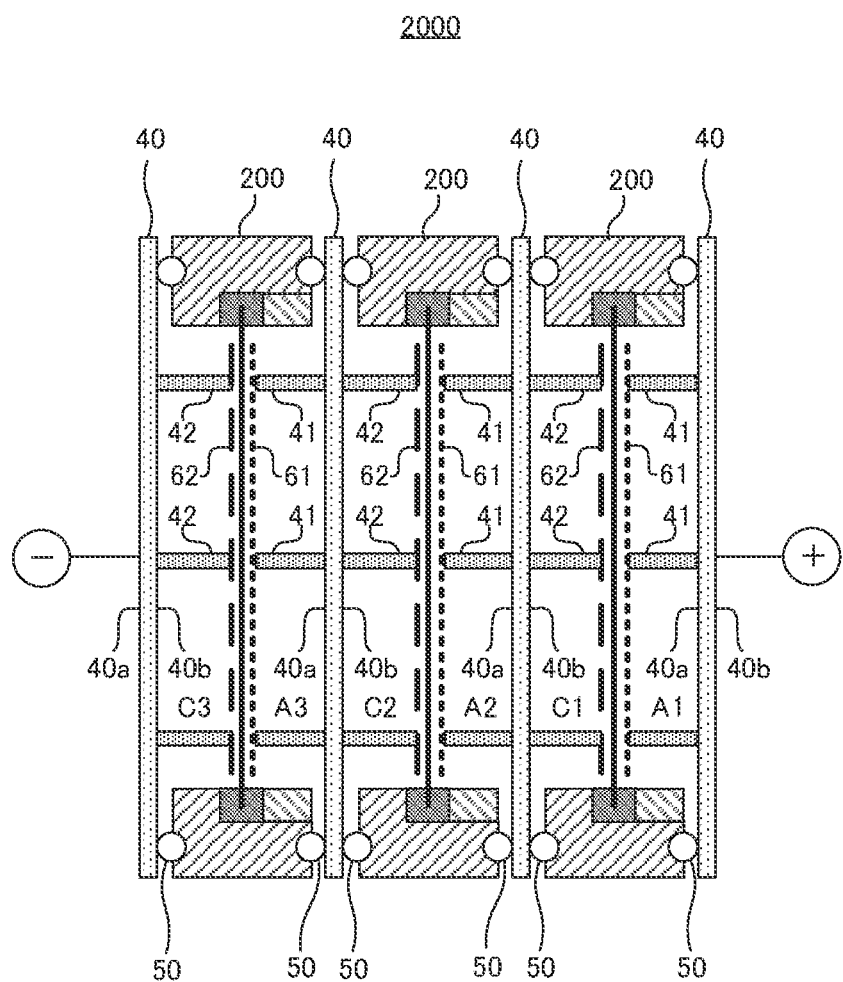
FIG. 4 is a schematically explanatory cross-sectional view of an electrolysis vessel 2000 according to another embodiment of the present invention.

FIG. 4 is a schematically explanatory cross-sectional view of an electrolysis vessel 2000 according to such another embodiment. In FIG. 4, the elements already shown in FIGS. 2A to 3 are given the same reference signs as in FIGS. 2A to 3, and the description thereof may be omitted. The electrolysis vessel 2000 is different from the electrolysis vessel 1000 in including separating membrane-gasket-protecting member assemblies 200 (hereinafter may be simply referred to as "assemblies 200") instead of the separating membrane-gasket-protecting member assemblies 100. FIGS. 5A to 5C are schematically explanatory views of one of the assemblies 200 included in the electrolysis vessel 2000. In FIGS. 5A to 5C, the elements already shown in FIGS. 2A to 3 are given the same reference signs as in FIGS. 2A to 3, and the description thereof may be omitted. FIG. 5A is a plan view of the assembly 200, FIG. 5B is a cross-sectional view taken along the arrows B-B in FIG. 5A, and FIG. 5C shows that only a base body 231 is taken out in FIG. 5B.

The assemblies 200 are different from the above described assemblies 100 in each including a protecting member 230 instead of the protecting member 30. The protecting member 230 is different from the above described protecting member 30 in including the frame-shaped base body 231 instead of the frame-shaped base body 31. The base body 231 is different from the above described base body 31 in including a first O-ring fixing groove 231e and a second O-ring fixing groove 231f.

The first O-ring fixing groove 231e is provided in the face 31c of the base body 231, which faces a corresponding first face 40a of the electroconductive separating walls 40 in the electrolysis vessel 2000. The first O-ring fixing groove 231e has a shape such that the sealing member (O-ring) 50 can be fixed between the face 31c of the base body 231 and the corresponding first face 40a of the electroconductive separating walls 40. The second O-ring fixing groove 231f is provided in a face 31d of the base body 231 which faces a corresponding second face 40b of the electroconductive separating walls 40 in the electrolysis vessel 2000. The second O-ring fixing groove 231f has a shape such that the sealing member (O-ring) 50 can be fixed between the face 31d of the base body 231 and the corresponding second face 40b of the electroconductive separating walls 40.

Each cross sectional face of the first O-ring fixing groove 231e and the second O-ring fixing groove 231f (see FIGS. 5B and 5C) has a shape such that part of the cross sectional face of the sealing member (O-ring) 50 can be received therein (see FIG. 4). The base body 231 of each of the assemblies 200 has the first O-ring fixing groove 231e, which causes the sealing member (O-ring) 50 arranged between the base body 231 of each of the assemblies 200 and the corresponding first face 40a of the electroconductive separating walls 40 in the electrolysis vessel 2000 to be held between the base body 231 and the corresponding first face 40a of the electroconductive separating walls 40 as the sealing member 50 fits into the first O-ring fixing groove 231e. Therefore, deformation of the sealing member (O-ring) 50 due to pressures inside first chambers is further suppressed. The base body 231 of each of the assemblies 200 has the second O-ring fixing groove 231f, which causes the sealing member (O-ring) 50 arranged between the base body 231 of each of the assemblies 200 and the corresponding second face 40b of the electroconductive separating walls 40 in the electrolysis vessel 2000 to be held between the base body 231 and the corresponding second face 40b of the electroconductive separating walls 40 as the sealing member 50 fits into the second O-ring fixing groove 231f. Therefore, deformation of the sealing member (O-ring) 50 due to pressures inside second chambers is further suppressed. Thus, the electrolysis vessel 2000 including the assemblies 200 can improve tolerance to pressures inside chambers while bad effect due to heat and mechanical pressure that the separating membranes receive is suppressed.

In the foregoing description concerning the present invention, the assemblies 200 each including the base body 231, which has the first and second O-ring fixing grooves 231e and 231f each having a complementary cross-sectional shape with those of the sealing member (O-ring) 50, and the electrolysis vessel 2000 including these assemblies 200 have been described as an example. The present invention is not limited to these embodiments. For example, the separating membrane-gasket-protecting member assemblies can each include a base body having first and second O-ring fixing grooves each having a V-shaped cross-sectional face, and the electrolysis vessel can include the assemblies.

In the aspect of using a flat gasket instead of an O-ring as the sealing member 50, the use of a flat gasket including a protruding portion on its main face also makes it possible to obtain the same effect as in the case where the sealing members 50, which are O-rings, are fixed by the first and second O-ring fixing grooves 231e and 231f. That is, the separating membrane-gasket-protecting member assemblies 200 each using a flat gasket having a protruding portion on its face facing the face 31c or the face 31d of the base body 231, instead of an O-ring; and each including a first protruding fixing groove in the face 31c of the base body 231 instead of the first O-ring fixing groove 231e, and a second protruding fixing groove in the face 31d of the base body 231 instead of the second O-ring fixing groove 231f are used, so that the protruding portion of the flat gasket is fit into the first or second protruding fixing groove provided in the face 31c or face 31d of the base body 231, which can further suppress deformation of the flat gaskets due to pressures inside chambers as well.

In the foregoing description concerning the present invention, the separating membrane-gasket-protecting member assemblies 200 each including the protecting member 231 having the O-ring fixing grooves 231e and 231f, and the electrolysis vessel 2000 including these assemblies 200 have been described as an example. The present invention is not limited to these embodiments. For example, the electrolysis vessel can include an electroconductive separating wall including an O-ring fixing groove.

Figure 6:
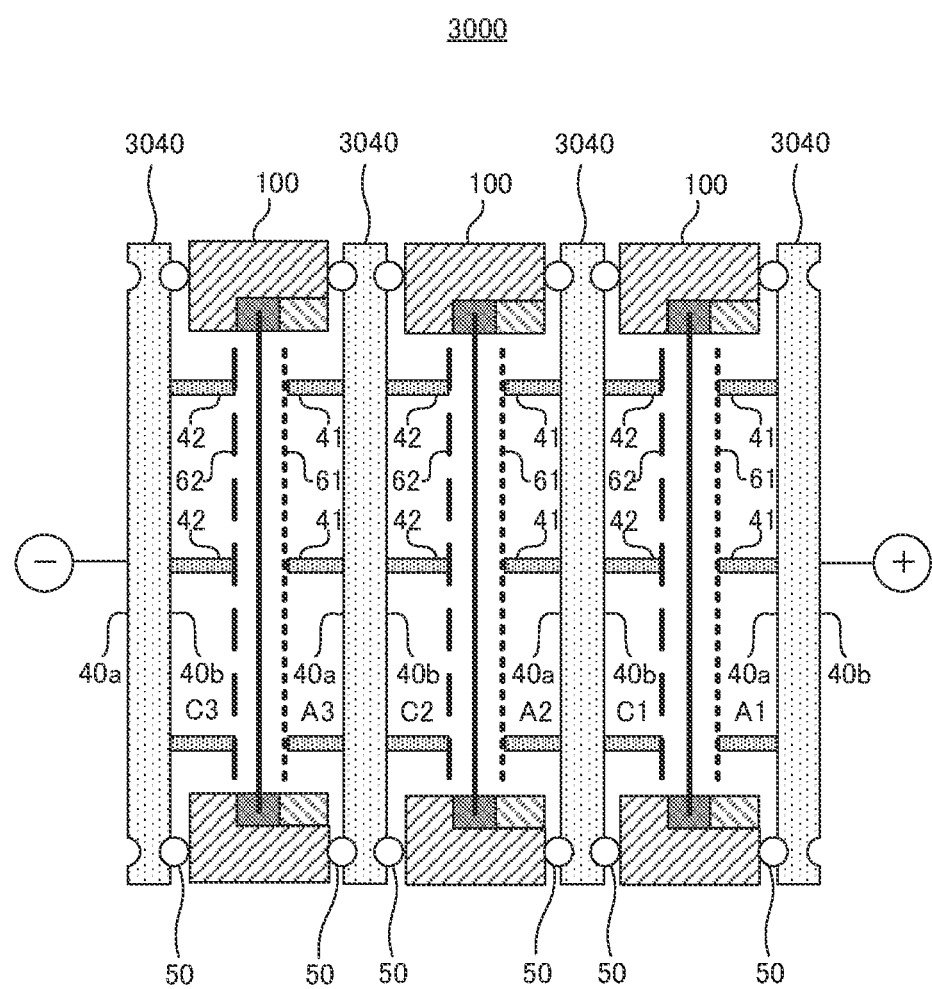
FIG. 6 is a schematically explanatory cross-sectional view of an electrolysis vessel 3000 according to yet another embodiment of the present invention.

FIG. 6 is a schematically explanatory cross-sectional view of an electrolysis vessel 3000 according to such another embodiment of the present invention. In FIG. 6, the elements already shown in FIGS. 2A to 5C are given the same reference signs as in FIGS. 2A to 5C, and the description thereof may be omitted. The electrolysis vessel 3000 is different from the above described electrolysis vessel 1000 in including electroconductive separating walls 3040, 3040, . . . (hereinafter may be simply referred to as "electroconductive separating walls 3040") instead of the electroconductive separating walls 40, 40, . . . . FIGS. 7A to 7C are schematically explanatory views of one of the electroconductive separating walls 3040. FIG. 7A is a plan view of the electroconductive separating wall 3040, FIG. 7B is a bottom view of the electroconductive separating wall 3040, and FIG. 7C is a cross-sectional view taken along the arrows C-C in FIG. 7B. The electroconductive separating walls 3040 are different from the above described electroconductive separating walls 40 in each including a first O-ring fixing groove 3040c in the first face 40a, and a second O-ring fixing groove 3040d in the second face 40b. The first O-ring fixing groove 3040c has a shape such that the sealing member (O-ring) 50 can be fixed between the first face 40a of the electroconductive separating wall 3040, and a corresponding base body 31 of the assemblies 100, and the second O-ring fixing groove 3040d has a shape such that the sealing member (O-ring) 50 can be fixed between the second face 40b of the electroconductive separating wall 3040, and the corresponding base body 31 of the assemblies 100.

Each cross sectional face of the first O-ring fixing groove 3040c and the second O-ring fixing groove 3040d (see FIG. 7C) has a shape such that part of the cross sectional face of the sealing member (O-ring) 50 can be received therein (see FIG. 6). The electroconductive separating wall 3040 having the first O-ring fixing groove 3040c causes the sealing member (O-ring) 50 arranged between the corresponding base body 31 of the assemblies 100 and the first face 40a of the electroconductive separating wall 3040 in the electrolysis vessel 3000 to be held between the corresponding base body 31 and the first face 40a of the electroconductive separating wall 3040 as the sealing member 50 fits into the first O-ring fixing groove 3040c. Therefore, deformation of the sealing member (O-ring) 50 due to pressures inside first chambers is further suppressed. The electroconductive separating wall 3040 having the second O-ring fixing groove 3040d causes the sealing member (O-ring) 50 arranged between the corresponding base body 31 of the assemblies 100 and the second face 40b of the electroconductive separating wall 3040 in the electrolysis vessel 3000 to be held between the corresponding base body 31 and the second face 40b of the electroconductive separating wall 3040 as the sealing member 50 fits into the second O-ring fixing groove 3040d. Therefore, deformation of the sealing member (O-ring) 50 due to pressures inside second chambers is further suppressed. Thus, the electrolysis vessel 3000 including the electroconductive separating walls 3040 can improve tolerance to pressures inside chambers while bad effect due to heat and mechanical pressure that the separating membranes receive is suppressed.

In the foregoing description concerning the present invention, the electrolysis vessel 3000 including an electroconductive separating wall defining only the first chamber A1 (that is, the second face 40b does not face any second chambers), and also having the second O-ring fixing groove 3040d in the second face 40b, and an electroconductive separating wall defining only the second chamber C3 (that is, the first face 40a does not face any first chambers), and also having the first O-ring fixing groove 3040c in the first face 40a has been described as an example. The present invention is not limited to this embodiment. For example, the electrolysis vessel can include an electroconductive separating wall only defining the first chamber (does not face any second chambers), and not having the second O-ring fixing groove in the second face, and an electroconductive separating wall only defining the second chamber (does not face any first chambers), and not having the first O-ring fixing groove in the first face.

In the foregoing description concerning the present invention, the electrolysis vessel 3000 including the electroconductive separating walls 3040, each of which has the first and second O-ring fixing grooves 3040c and 3040d having complementary cross-sectional shapes with that of the sealing member (O-ring) 50 has been described as an example. The present invention is not limited to this embodiment. For example, the electrolysis vessel can include an electroconductive separating wall having first and second O-ring fixing grooves having V-shaped cross-sectional faces.

In the aspect of using a flat gasket instead of an O-ring as the sealing member 50, the use of a flat gasket including a protruding portion on its main face also makes it possible to obtain the same effect as in the case where the sealing members 50, which are O-rings, are fixed by the first and second O-ring fixing grooves 3040c and 3040d. That is, the electroconductive separating wall 3040 using a flat gasket having a protruding portion on its face facing the first face 40a or the second face 40b instead of an O-ring; and including a first protruding fixing groove in the first face 40a instead of the first O-ring fixing groove 3040c, and a second protruding fixing groove in the second face 40b instead of the second O-ring fixing groove 3040d, so that the protruding portion of the flat gasket is fit into the first or second protruding fixing groove provided in the first face 40a or the second face 40b, which can further suppress deformation of the flat gasket due to pressures inside chambers as well.

<3. Electrolysis Element>

Figure 8A:
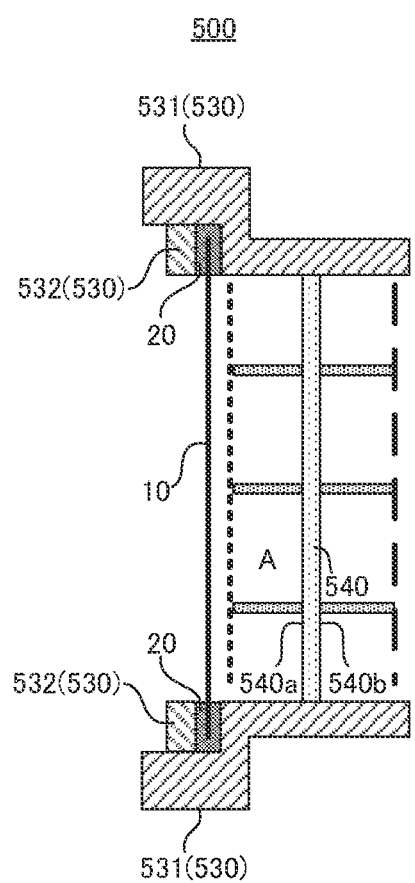
FIGS. 8A and 8B are schematically explanatory views of an electrolysis element 500 according to one embodiment of the present invention.
Figure 8B:
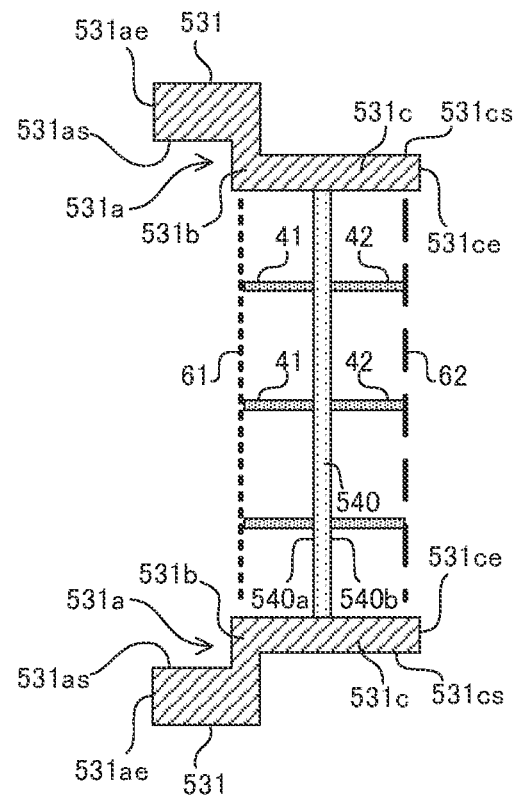

FIGS. 8A and 8B are schematically explanatory views of an electrolysis element 500 according to one embodiment of the present invention. In FIGS. 8A and 8B, the elements already shown in FIGS. 2A to 7C are given the same reference signs as in FIGS. 2A to 7C, and the description thereof may be omitted. FIG. 8A is a schematically explanatory view of the electrolysis element 500, and FIG. 8B is a cross-sectional view showing a position where the separating membrane 10, the gasket 20, and a lid member 532 are removed in FIG. 8A.

The electrolysis element 500 includes: the ion-permeable separating membrane 10; the gasket 20 holding the periphery of the separating membrane 10; the frame-shaped protecting member 530 holding the gasket 20; and an electroconductive separating wall 540 having a first face 540a and a second face 540b (hereinafter may be referred to as "electroconductive separating wall 540"). The protecting member 530 includes: a frame-shaped base body 531; and the frame-shaped lid member 532.

The base body 531 includes: a receiving part 531a arranged in the inner periphery of the base body 531 and receiving the gasket 20 and the lid member 532; and a supporting part 531b protruding from the receiving part 531a and extending toward the inner periphery side of the base body 531, and supporting the gasket 20 received in the receiving part 531a in the direction crossing the main face of the separating membrane 10. The lid member 532 has dimensions such that the lid member 532 can be received in the receiving part 531a of the base body 531. The gasket 20 and the lid member 532 are received in the receiving part 531a of the base body 531, such that the gasket 20 is sandwiched between and held by the supporting part 531b of the base body 531 and the lid member 532. When the gasket 20 and the lid member 532 are received in the receiving part 531a of the base body 531, a difference in levels is formed between an end 531ae of the base body 531 on the receiving part 531a side, and the lid member 532. That is, the depth of the receiving part 531a of the base body 531 (that is, the depth from the end 531ae of the base body 531, which defines an end of the receiving part 531a, to the supporting part 531b) is larger than the total thickness of the gasket 20 holding the periphery of the separating membrane 10, and the lid member 532.

The electroconductive separating wall 540 is arranged such that the first face 540a faces the separating membrane 10; the outer periphery of the electroconductive separating wall 540 is joined with the inner periphery of the supporting part 531b of the base body 531 so as to be watertight and airtight over the entire circumference, or is united with the inner periphery of the supporting part 531b into one body over the entire circumference. The base body 531 includes a protruding flange part 531c being continuous with the supporting part 531b and protruding from the outer periphery of the electroconductive separating wall 540 toward the side of the second face 540b. The dimensions of an outer periphery 531cs of the protruding flange part 531c in the circumferential direction (that is, the dimensions in a direction orthogonal to the direction across the sheet of FIGS. 8A and 8B between left and right; in other words, the dimensions in a cross-sectional face parallel to the first face 540a of the electroconductive separating wall 540; or further, the dimensions in a cross-sectional face parallel to the main face of the separating membrane 10) are smaller than or equal to those of an inner periphery 531as of the receiving part 531a. That is, the protruding flange part 531c has a shape and dimensions such that the protruding flange part 531c can be received in the receiving part 531a. As described above, since the receiving part 531a of the base body 531 has a depth larger than the total thickness of the gasket 20 holding the periphery of the separating membrane 10 and the lid member 532, the outer periphery of the protruding flange part 531c of another electrolysis element 500 is further received in the receiving part 531a at least at an end of the protruding flange part 531c when the gasket 20 holding the periphery of the separating membrane 10, and the lid member 532 are received in the receiving part 531a of the electrolysis element 500. Thus, the electrolysis element 500 makes it easy to position adjacent electrolysis elements when an electrolysis vessel having a stacked structure including a plurality of the electrolysis element 500 being stacked is assembled.

In the base body 531, the first face 540a of the electroconductive separating wall 540 and the separating membrane 10 facing the first face 540a define therebetween the first chamber (anode chamber) A including the first electrode (anode) 61 arranged therein and electrically connected with the electroconductive separating wall 540. The first electrode (anode) 61 is held by the electroconductive ribs 41, 41, . . . arranged so that the electroconductive ribs 41, 41, . . . protrude from the first face 540a of the electroconductive separating wall 540. The electroconductive ribs 41 are electrically connected with the electroconductive separating wall 540 and the first electrode 61. The base body 531 further includes electroconductive ribs 42, 42, . . . arranged so that the electroconductive ribs 42, 42, . . . protrude from the second face 540b of the electroconductive separating wall 540, and the second electrode (cathode) 62 held by the electroconductive ribs 42. The electroconductive ribs 42 are electrically connected with the electroconductive separating wall 540 and the second electrode 62, and thus the second electrode 62 is electrically connected with the electroconductive separating wall 540.

Any alkali-resistant rigid electroconductive material as described above concerning the electroconductive separating wall 40 may be used as the material of the electroconductive separating wall 540 without particular limitations. A preferred aspect thereof is also the same as in the above description.

The base body 531 may be made from a metal, or may be formed of an electrically insulating material. Examples of the metallic material forming the base body 531 include metallic materials same as described above concerning the electroconductive separating wall 40. A preferred aspect thereof is also the same as in the above description. Examples of the electrically insulating material forming the base body 531 include electrically insulating materials same as described above concerning the base body 31. A preferred aspect thereof is also the same as in the above description. When the base body 531 is formed of an electrically insulating material, the electroconductive separating wall 540 is preferably joined with the base body 531 in the electrolysis element 500. As a means for joining the base body 531 formed of an electrically insulating material with the electroconductive separating wall 540, a known joining means such as adhesion with an adhesive can be used. When the base body 531 is made from a metal, the base body 531 may be joined with the electroconductive separating wall 540, or may be united with the electroconductive separating wall 540 into one body, in the electrolysis element 500. As a means for joining the base body 531 made from a metal with the electroconductive separating wall 540, a known joining means between metals such as welding and brazing can be used. As a means for uniting the base body 531 made from a metal with the electroconductive separating wall 540 into one body, a known means such as casting, forging, and cutting can be used.

The lid member 532 may be made from a metal, or may be formed of an electrically insulating material. Examples of the metallic material forming the lid member 532 include metallic materials same as described above concerning the base body 31. A preferred aspect thereof is also the same as in the above description.

When the base body 531 is made from a metal, it is necessary to prevent short-circuiting between the base bodies 531 of adjacent electrolysis elements 500, 500 in an electrolysis vessel described later. For example, in one embodiment, the dimensions of the inner periphery 531as of the receiving part 531a of the base body 531 in the circumferential direction (that is, the dimensions in a direction orthogonal to the direction across the sheet of FIGS. 8A and 8B between left and right; in other words, the dimensions in a cross-sectional face parallel to the first face 540a of the electroconductive separating wall 540; or further, the dimensions in a cross-sectional face parallel to the main face of the separating membrane 10) are preferably larger than the dimensions of the outer periphery 531cs of the protruding flange part 531c in the circumferential direction (see FIG. 8B). The inner periphery 531as of the receiving part 531a has dimensions larger than those of the outer periphery 531cs of the protruding flange part 531c in the circumferential direction, which makes it possible to arrange adjacent electrolysis elements 500, 500 when the outer periphery of the protruding flange part 531c of the other electrolysis element 500 is further received in the receiving part 531a of the electrolysis element 500 at least at an end 531ce of the protruding flange part 531c, so that the outer periphery 531cs of the protruding flange part 531c of the other electrolysis element 500 is not directly in contact with the inner periphery 531as of the receiving part 531a of the electrolysis element 500 as described later. This makes it possible to prevent short-circuiting.

Figure 9A:
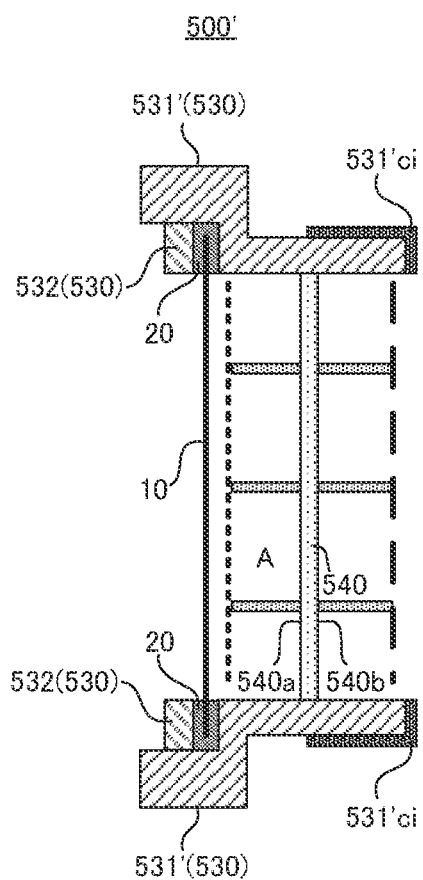
FIGS. 9A and 9B are schematically explanatory views of an electrolysis element 500' according to another embodiment of the present invention.
Figure 9B:
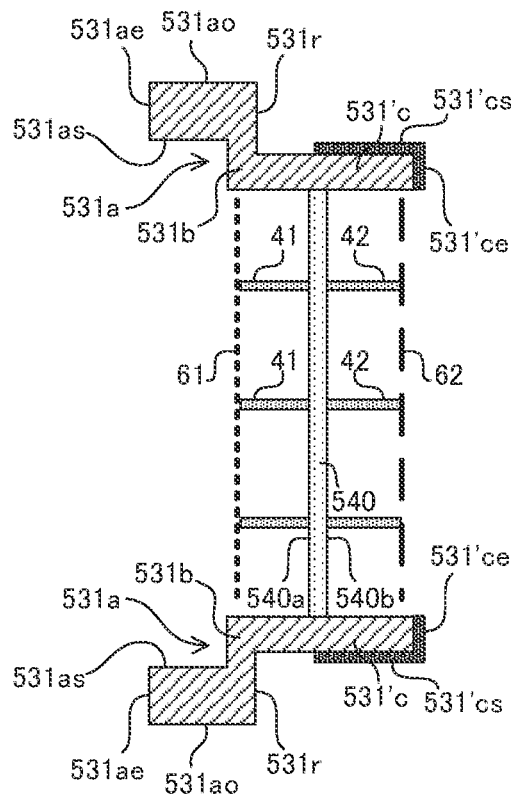

For example, in one embodiment, preferably, the electrolysis element 500 further includes an electrical insulating member provided so that the electrical insulating member prevents short-circuiting between the base body 531 of the electrolysis element and the base body 531 of the other electrolysis element when the outer periphery of the protruding flange part 531c of the other electrolysis element 500 is further received in the receiving part 531a of the electrolysis element 500 at least at the end 531ce of the protruding flange part 531c. FIGS. 9A and 9B are schematically explanatory cross-sectional views of an electrolysis element 500' according to such another embodiment. In FIGS. 9A and 9B, the elements already shown in FIGS. 2A to 8B are given the same reference signs as in FIGS. 2A to 8B, and the description thereof may be omitted. FIG. 9A is a schematically explanatory cross-sectional view of the electrolysis element 500'. FIG. 9B shows that the separating membrane 10, the gasket 20, and the lid member 532 are removed in FIG. 9A. The electrolysis element 500' is different from the electrolysis element 500 in including a base body 531' instead of the base body 531. The base body 531' is different from the base body 531 in that at least part of the surfaces of an end 531'ce of a protruding flange part 531'c, and an outer periphery 531'cs of the protruding flange part 531'c which is continuous with the end 531'ce is formed of an electrical insulating member 531'ci. That is, at least part of the surfaces of the end 531'ce of the protruding flange part 531'c, and the outer periphery 531'cs of the protruding flange part 531'c, which is continuous with the end 531'ce, is formed of the electrical insulating member 531'ci, and the other parts in the base body 531' are made from a metal. The surface of a level difference part 531r linking an outer periphery 531ao that is a part where the receiving part 531a of the base body 531' is provided, to the outer periphery 531'cs of the protruding flange part 531'c may be further formed of the electrical insulating member 531'ci. In the electrolysis element 500', the outer periphery 531'cs of the protruding flange part 531'c including the electrical insulating member 531'ci also has dimensions smaller than or equal to those of the inner periphery 531as of the receiving part 531a. Such an electrolysis element 500' can also prevent short-circuiting between the base body 531' of the electrolysis element 500' and the base body 531' of another electrolysis element 500' when the protruding flange part 531'c of the one electrolysis element 500' is received in the receiving part 531a of the electrolysis element 500'.

As the material of the electrical insulating member 531'ci, for example, an electrically insulating material such as elastomers including acrylonitrile-butadiene rubber (NBR), fluoro rubber (FKM), urethane rubber (AU), polychloroprene (CR), ethylene propylene rubber (EPT), and ethylene propylene diene monomer rubber (EPDM); nonfluorine based resins including polypropylene (PP), polyvinyl chloride (PVC), polyethylene terephthalate (PET), and phenol resins (PF); and fluorine based resins including polytetrafluoroethylene (PTFE), tetrafluoroethylene-perfluoroalkyl vinyl ether copolymer (PFA), tetrafluoroethylene-hexafluoropropylene copolymer (FEP), and tetrafluoroethylene-ethylene copolymer (ETFE) may be employed without particular limitations. A known means such as adhesion, lining, and welding can be used without particular limitations for forming the surface of the protruding flange part of the electrical insulating member 531'ci.

Figure 10A:
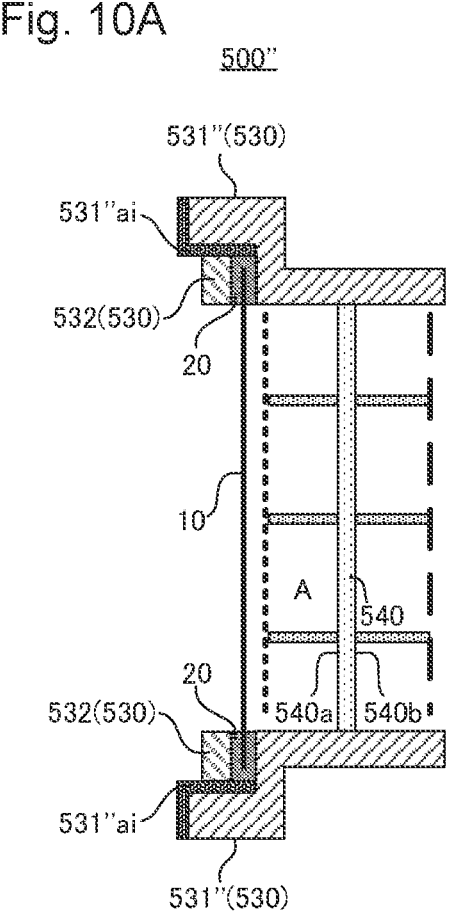
FIGS. 10A and 10B are schematically explanatory views of an electrolysis element 500" according to yet another embodiment of the present invention.
Figure 10B:
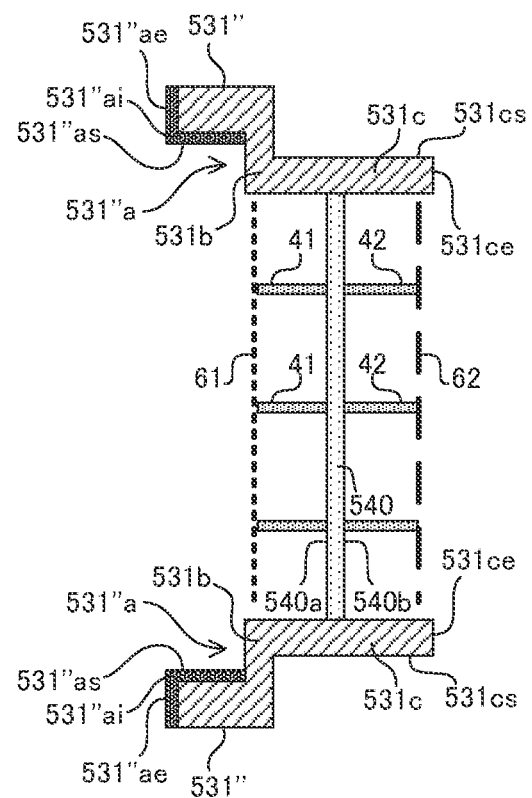

In the above description of the present invention, the electrolysis element 500' including the protruding flange part, an end of which has a surface formed of the electrical insulating member 531'ci, has been described as an example. The present invention is not limited to this embodiment. For example, the electrolysis element can include the receiving part 531a in the base body 531 such that the inner periphery 531as of the receiving part 531a is formed of an electrical insulating member. FIGS. 10A and 10B are schematically explanatory cross-sectional views of an electrolysis element 500" according to such another embodiment. In FIGS. 10A and 10B, the elements already shown in FIGS. 2A to 9B are given the same reference signs as in FIGS. 2A to 9B, and the description thereof may be omitted. FIG. 10A is a schematically explanatory cross-sectional view of the electrolysis element 500". FIG. 10B shows that the separating membrane 10, the gasket 20, and the lid member 532 are removed in FIG. 10A. The electrolysis element 500" is different from the electrolysis element 500 in including a base body 531" instead of the base body 531. The base body 531" is different from the base body 531 in that the surface of an end 531"ae of the base body 531" which defines an inner periphery 531"as of the receiving part 531"a, and an end of the receiving part 531"a are formed of an electrical insulating member 531"ai. That is, the inner periphery 531"as of the receiving part 531"a, and the surface of the end 531"ae of the base body 531", which defines the end of the receiving part 531"a, are formed of the electrical insulating member 531"ai, and the other parts in the base body 531" are made from a metal. In the electrolysis element 500', the outer periphery 531cs of the protruding flange part 531c also has dimensions smaller than or equal to those of the inner periphery 531"as of the receiving part 531"a including the electrical insulating member 531"ai. Such an electrolysis element 500" can also prevent short-circuiting between the base body 531" of the electrolysis element 500" and the base body 531" of another electrolysis element 500" when the protruding flange part 531c of the other electrolysis element 500" is received in the receiving part 531"a of the electrolysis element 500".

In the foregoing description concerning the present invention, the electrolysis elements 500, 500', and 500" each including the anode as the first electrode 61 arranged between the first face 540a of the electroconductive separating wall 540 and the separating membrane 10, and the cathode as the second electrode 62 held by the electroconductive ribs 42 provided so that the electroconductive ribs 42 protrude from the second face 540b of the electroconductive separating wall 540 have been described as an example. The present invention is not limited to these embodiments. For example, the electrolysis elements can each include the cathode as the first electrode 61 arranged between the first face 540a of the electroconductive separating wall and the separating membrane 10, and the anode as the second electrode 62 held by the electroconductive ribs 42 provided so that the electroconductive ribs 42 protrude from the second face 540b of the electroconductive separating wall 540.

<4. Electrolysis Vessel (2)>

Figure 11:
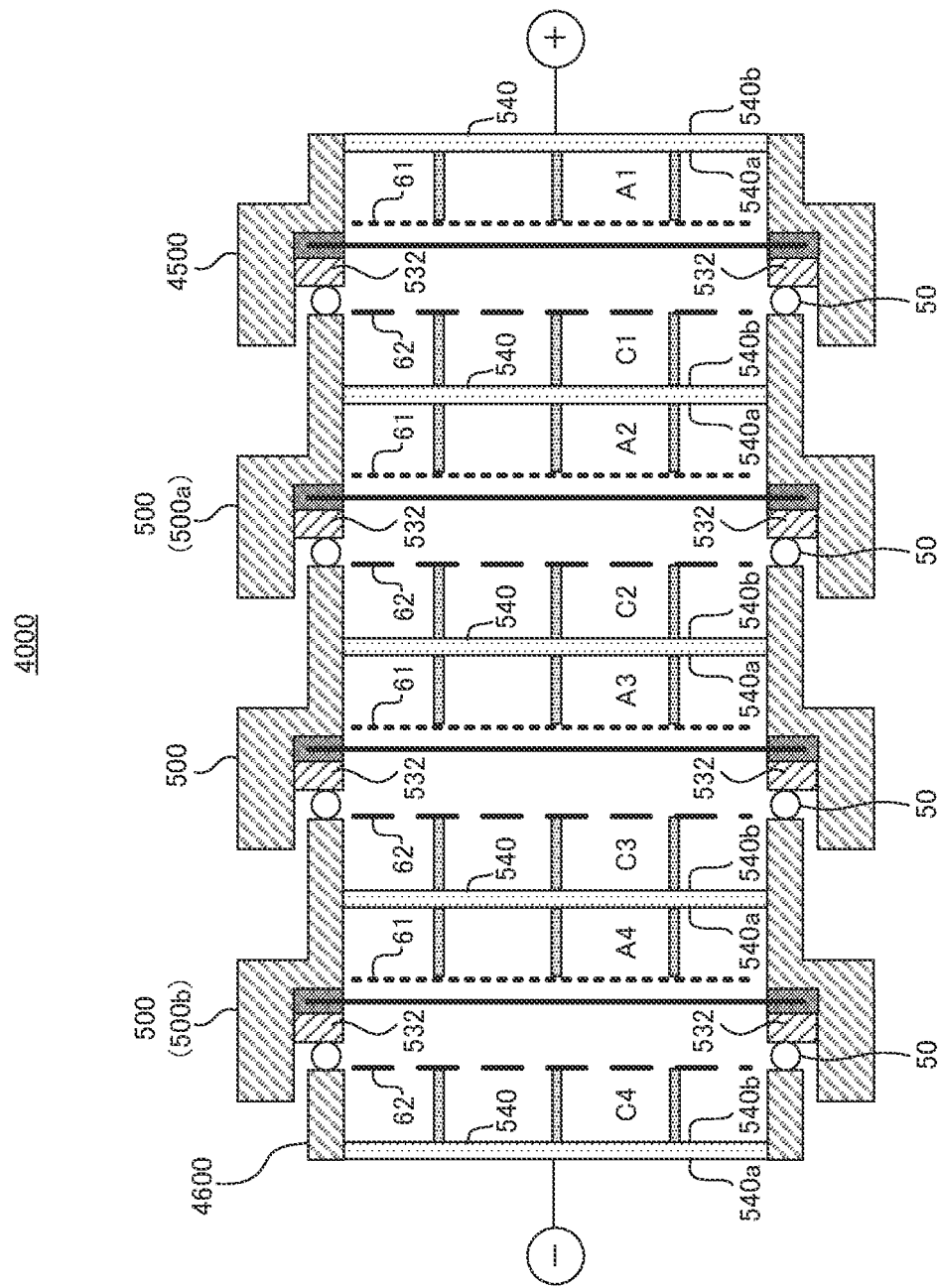
FIG. 11 is a schematically explanatory cross-sectional view of an electrolysis vessel 4000 according to still another embodiment of the present invention.

FIG. 11 is a schematically explanatory cross-sectional view of an electrolysis vessel 4000 according to another embodiment of the present invention. In FIG. 11, the elements already shown in FIGS. 2A to 10B are given the same reference signs as in FIGS. 2A to 10B, and the description thereof may be omitted.

The electrolysis vessel 4000 has a stacked structure including a plurality of electrolysis element 500, 500, . . . being stacked. In the stacked structure, for each adjacent pair of the electrolysis elements 500, 500, at least part of the protruding flange part 531c of one electrolysis element 500 is received in the receiving part 531a of the other electrolysis element 500, such that the protruding flange part 531c of the one electrolysis element 500 and the supporting part 531b of the other electrolysis element 500 sandwich therebetween and hold thereby the gasket 20 (holding the periphery of the separating membrane 10) and the lid member 532 of the other electrolysis element 500. The first face 540a of the electroconductive separating wall 540 and the separating membrane 10 facing the first face 540a define the first chamber (anode chamber A2, A3, A4) therebetween, which includes the first electrode (anode) 61 arranged therein and electrically connected with the electroconductive separating wall 540; and the second face 540b of the electroconductive separating wall 540 and the separating membrane 10 facing the second face 540b define the second chamber (cathode chamber C2, C3) therebetween, which includes the second electrode (cathode) 62 arranged therein and electrically connected with the electroconductive separating wall 540.

In the electrolysis vessel 4000, for each adjacent pair of the electrolysis elements 500, 500, the protruding flange part 531c of the one electrolysis element 500 and the lid member 532 of the other electrolysis element 500 sandwich an O-ring as the sealing member 50, to hold the O-ring therebetween.

In the electrolysis vessel 4000, one of the electrolysis elements 500 including the protruding flange part 531c facing the outside at one end of the stacked structure of the electrolysis elements 500, 500, . . . is referred to as a first electrolysis element 500a; and one of the electrolysis elements 500 including the receiving part 531a facing the outside at the other end of the stacked structure of the electrolysis elements 500, 500, . . . is referred to as a second electrolysis element 500b. The electrolysis vessel 4000 further includes a first terminal element 4500 arranged so that the first terminal element 4500 faces the second face 540b of the electroconductive separating wall 540 of the first electrolysis element 500a, and a second terminal element 4600 arranged so that the second terminal element 4600 faces the separating membrane 10 of the second electrolysis element 500b.

Figure 12A:
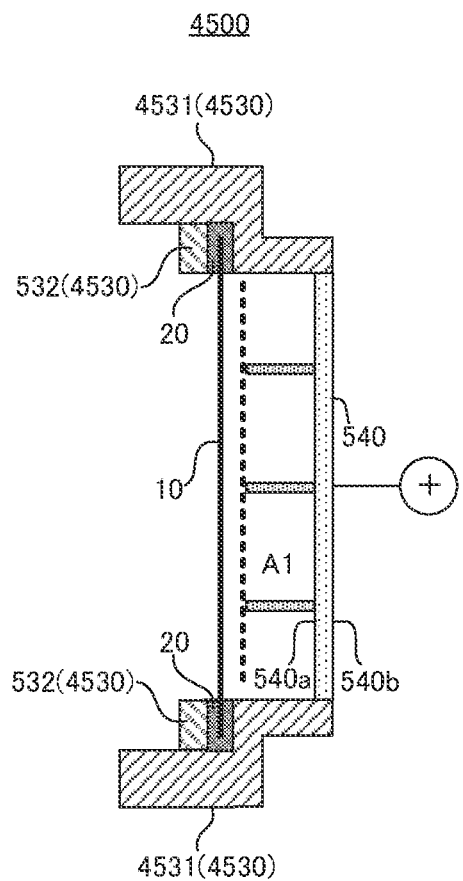
FIGS. 12A and 12B are schematically explanatory views of a first terminal element 4500.
Figure 12B:
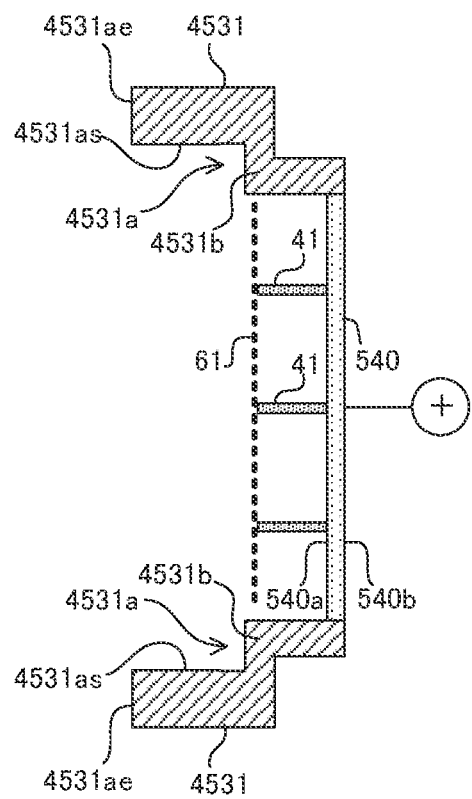

FIGS. 12A and 12B are schematically explanatory views of the first terminal element 4500. In FIGS. 12A and 12B, the elements already shown in FIGS. 2A to 11 are given the same reference signs as in FIGS. 2A to 11, and the description thereof may be omitted. FIG. 12A is a schematically explanatory cross-sectional view of the first terminal element 4500. FIG. 12B shows that the separating membrane 10, the gasket 20, and the lid member 532 are removed in FIG. 12A. The first terminal element 4500 includes the ion-permeable separating membrane 10 (first separating membrane), the gasket 20 (first gasket) holding the periphery of the separating membrane 10 (first separating membrane), a frame-shaped protecting member (first protecting member) 4530 holding the gasket 20 (first gasket), and the electroconductive separating wall 540 (first electroconductive separating wall) having the first face 540a and the second face 540b.

The protecting member (first protecting member) 4530 includes a frame-shaped base body (first base body) 4531, and the frame-shaped lid member 532 (first lid member). The base body (first base body) 4531 is different from the above described base body 531 of the electrolysis element 500 in not including the protruding flange part 531c, the second electrode 62, or the electroconductive rib 42. That is, the base body (first base body) 4531 includes: a receiving part (first receiving part) 4531a arranged in the inner periphery of the base body 4531 and receiving the gasket 20 and the lid member 532; and a supporting part 4531b (first supporting part) protruding from the receiving part 4531a and extending toward the inner periphery of the base body 4531, and supporting the gasket 20 (first gasket) received in the receiving part 4531a in the direction crossing the main face of the separating membrane 10 (first separating membrane). The lid member 532 (first lid member) has dimensions such that the lid member 532 can be received in the receiving part 4531a of the base body 4531. The gasket 20 (first gasket) (holding the periphery of the separating membrane 10) and the lid member 532 (first lid member) are received in the receiving part 4531a of the base body 4531, such that the gasket 20 (first gasket) is sandwiched between and held by the supporting part 4531a of the base body 4531 and the lid member 532 (first lid member). When the gasket 20 (first gasket) and the lid member 532 (first lid member) are received in the receiving part 4531a of the base body 4531, a difference in levels is formed between an end 4531ae of the base body 4531 on the receiving part 4531a side, and the lid member 532 (first lid member). That is, the depth of the receiving part 4531a of the base body 4531 (that is, the depth from the end 4531ae of the base body 4531, which defines an end of the receiving part 4531a, to the supporting part 4531b) is larger than the total thickness of the gasket 20 (first gasket) holding the periphery of the separating membrane 10 (first separating membrane), and the lid member 532 (first lid member).

In the first terminal element 4500, the electroconductive separating wall 540 (first electroconductive separating wall) is arranged such that the first face 540a of the electroconductive separating wall 540 (first electroconductive separating wall) faces the separating membrane 10 (first separating membrane). The outer periphery of the electroconductive separating wall 450 (first electroconductive separating wall) is joined with the supporting part 4531b of the base body 4531 so as to be watertight and airtight over the entire circumference, or is united with the supporting part 4531b into one body over the entire circumference.

In the electrolysis vessel 4000, at least part of the protruding flange part 531c of the first electrolysis element 500a is further received in the receiving part 4531a of the first terminal element 4500, such that the protruding flange part 531c of the first electrolysis element 500a and the supporting part 4531b of the first terminal element 4500 sandwich the gasket 20 (first gasket) (holding the periphery of the separating membrane 10 (first separating membrane)) and the lid member 532 (first lid member) of the first terminal element 4500, to hold the gasket 20 and the lid member 532 of the first terminal element 4500 therebetween (see FIG. 11).

The inner periphery 4531as of the receiving part 4531a of the first terminal element 4500 has dimensions equal to or larger than those of the outer periphery 531cs of the protruding flange part 531c of the first electrolysis element 500a. That is, the receiving part 4531a of the first terminal element 4500 has shapes and dimensions such that the protruding flange part 531c of the first electrolysis element 500a can be received therein. As described above, since the receiving part 4531a of the base body 4531 of the first terminal element 4500 has a depth larger than the total thickness of the gasket 20 (first gasket) holding the periphery of the separating membrane 10 (first separating membrane), and the lid member 532 (first lid member), the outer periphery of the protruding flange part 531c of the first electrolysis element 500a can be further received in the receiving part 4531a at least at the end of the protruding flange part 531c when the gasket 20 (first gasket) holding the periphery of the separating membrane 10 (first separating membrane), and the lid member 532 (first lid member) are received in the receiving part 4531a of the first terminal element 4500. Thus, in the electrolysis vessel 4000, it is easy to position the first electrolysis element 500a and the first terminal element 4500 when the first electrolysis element 500a and the first terminal element 4500 are stacked.

In the electrolysis vessel 4000, the first face 540a of the electroconductive separating wall 540 (first electroconductive separating wall) of the first terminal element 4500 and the separating membrane 10 (first separating membrane) of the first terminal element 4500 further define therebetween the first chamber (anode chamber A1), which includes the first electrode (anode) 61 arranged therein and electrically connected with the electroconductive separating wall 540 (first electroconductive separating wall) of the first terminal element 4500; and the second face 540b of the electroconductive separating wall 540 of the first electrolysis element 500a and the separating membrane 10 (first separating wall) of the first terminal element 4500 further define therebetween the second chamber (cathode chamber C1), which includes the second electrode (cathode) 62 arranged therein and electrically connected with the electroconductive separating wall 540 of the first electrolysis element 500a (see FIG. 11).

In the first terminal element 4500, the first electrode (anode) 61 is held by the electroconductive ribs 41, 41, ... provided so that the electroconductive ribs 41, 41, ... protrude from the first face 540a of the electroconductive separating wall 540 (first electroconductive separating wall) (see FIG. 12B). The electroconductive ribs 41 are electrically connected with the electroconductive separating wall 540 (first electroconductive separating wall) and the first electrode 61.

In the first terminal element 4500 (see FIGS. 12A and 12B), the base body 4531 may be made from a metal, or may be formed of an electrically insulating material. Examples of the metallic material forming the base body 4531 include metallic materials same as described above concerning the electroconductive separating wall 40. A preferred aspect thereof is also the same as in the above description. Examples of the electrically insulating material forming the base body 4531 include electrically insulating materials same as described above concerning the base body 31. A preferred aspect thereof is also the same as in the above description. When the base body 4531 is formed of an electrically insulating material, the electroconductive separating wall 540 (first electroconductive separating wall) is preferably joined with the base body 4531 in the first terminal element 4500. As a means for joining the base body 4531 formed of an electrically insulating material with the electroconductive separating wall 540 (first electroconductive separating wall), a known joining means such as adhesion with an adhesive can be used. When the base body 4531 is made from a metal, the base body 4531 may be joined with the electroconductive separating wall 540 (first electroconductive separating wall), or may be united with the electroconductive separating wall 540 (first electroconductive separating wall) into one body in the first terminal element 4500. As a means for joining the base body 4531 made from a metal, with the electroconductive separating wall 540 (first electroconductive separating wall), a known joining means between metals such as welding and brazing can be used. As a means for uniting the base body 4531 made from a metal, with the electroconductive separating wall 540 (first electroconductive separating wall) into one body, a known means such as casting, forging, and cutting can be used.

Figure 13:
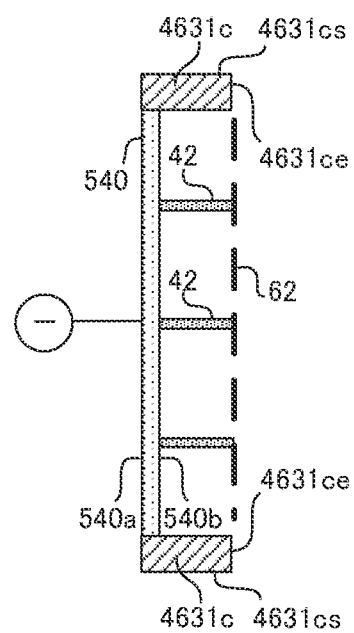
FIG. 13 is a schematically explanatory cross-sectional view of a second terminal element 4600.

FIG. 13 is a schematically explanatory cross-sectional view of the second terminal element 4600. In FIG. 13, the elements already shown in FIGS. 2A to 12B are given the same reference signs as in FIGS. 2A to 12B, and the description thereof may be omitted. The second terminal element 4600 includes the electroconductive separating wall 540 (second electroconductive separating wall) having the first face 540a and the second face 540b; and a protruding flange part 4631c (second protruding flange part) being joined with the outer periphery of the electroconductive separating wall 540 (second electroconductive separating wall) so that the outer periphery is watertight and airtight over the entire circumference, or being united with the outer periphery of the electroconductive separating wall 540 (second electroconductive separating wall) into one body over the entire circumference, an end of which protrudes from the outer periphery of the electroconductive separating wall 540 (second electroconductive separating wall) and extends toward the side of the second face 540b of the electroconductive separating wall 540 (second electroconductive separating wall). The dimensions of an outer periphery 4631cs of the protruding flange part 4631c at least at the end 4631ce of the protruding flange part 4631c in the circumferential direction (that is, the dimensions in a direction orthogonal to the direction across the sheet of FIG. 13 between left and right; in other words, the dimensions in a cross-sectional face parallel to the second face 540b of the electroconductive separating wall 540 (second electroconductive separating wall) of the second terminal element 4600) are smaller than or equal to those of the inner periphery 531as of the receiving part 531a of the second electrolysis element 500b in the circumferential direction. That is, the protruding flange part 4631c of the second terminal element 4600 has dimensions such that the protruding flange part 4631c can be received in the receiving part 531a of the second electrolysis element 500b.

In the electrolysis vessel 4000, at least part of the protruding flange part 4631c of the second terminal element 4600 is further received in the receiving part 531a of the second electrolysis element 500b, such that the protruding flange part 4631c of the second terminal element 4600 and the supporting part 531b of the second electrolysis element 500b sandwich the gasket 20 and the lid member 532 of the second electrolysis element 500b, to hold the gasket 20 and the lid member 532 of the second electrolysis element 500b therebetween (see FIG. 11). Thus, in the electrolysis vessel 4000, it is easy to position the second electrolysis element 500b and the second terminal element 4600 when the second electrolysis element 500b and the second terminal element 4600 are stacked.

In the electrolysis vessel 4000, the second face 540b of the electroconductive separating wall 540 (second electroconductive separating wall) of the second terminal element 4600 and the separating membrane 10 of the second electrolysis element 500b further define therebetween the second chamber (cathode chamber C4), which includes the second electrode (cathode) 62 arranged therein and electrically connected with the electroconductive separating wall 540

(second electroconductive separating wall) of the second terminal element 4600 (see FIG. 11).

In the second terminal element 4600, the second electrode 62 is held by the electroconductive ribs 42, 42, . . . provided so that the electroconductive ribs 42, 42, . . . protrude from the second face 540*b* of the electroconductive separating wall 540 (second electroconductive separating wall) (see FIG. 13). The electroconductive ribs 42 are electrically connected with the electroconductive separating wall 540 (second electroconductive separating wall) and the second electrode 62.

In the electrolysis vessel 4000, the protruding flange part 531*c* of the first electrolysis element 500*a* and the lid member 532 (first lid member) of the first terminal element 4500 sandwich an O-ring as the sealing member 50, to hold the O-ring therebetween; and the protruding flange part 4631*c* of the second terminal element 4600 and the lid member 532 of the second electrolysis element 500*b* sandwich an O-ring as the sealing member 50, to hold the O-ring therebetween (see FIG. 11).

In the second terminal element 4600 (see FIG. 13), the protruding flange part 4631*c* may be made from a metal, or may be formed of an electrically insulating material. Examples of the metallic material forming the protruding flange part 4631*c* include metallic materials same as described above concerning the electroconductive separating wall 40. A preferred aspect thereof is also the same as in the above description. Examples of the electrically insulating material forming the protruding flange part 4631*c* include electrically insulating materials same as described above concerning the base body 31. A preferred aspect thereof is also the same as in the above description. When the protruding flange part 4631*c* is formed of an electrically insulating material, the electroconductive separating wall 540 (second electroconductive separating wall) is preferably joined with the protruding flange part 4631*c* in the second terminal element 4600. As a means for joining the protruding flange part 4631*c* formed of an electrically insulating material with the electroconductive separating wall 540 (second electroconductive separating wall), a known joining means such as adhesion with an adhesive can be used. When the protruding flange part 4631*c* is made from a metal, the protruding flange part 4631*c* may be joined with the electroconductive separating wall 540 (second electroconductive separating wall), or may be united with the electroconductive separating wall 540 (second electroconductive separating wall) into one body in the second terminal element 4600. As a means for joining the protruding flange part 4631*c* made from a metal with the electroconductive separating wall 540 (second electroconductive separating wall), a known joining means between metals such as welding and brazing can be used. As a means for uniting the protruding flange part 4631*c* made from a metal with the electroconductive separating wall 540 (second electroconductive separating wall) into one body, a known means such as casting, forging, and cutting can be used.

In the electrolysis vessel 4000, an anode terminal is connected with the electroconductive separating wall 540 (first electroconductive separating wall) of the first terminal element 4500, and a cathode terminal is connected with the electroconductive separating wall 540 (second electroconductive separating wall) of the second terminal element 4600 (see FIG. 11). The anode terminal is connected to a cathode of a DC power supply, and the cathode terminal is connected to an anode of the DC power supply. The electrolysis vessel 4000 further includes a first electrolyte supply flow path (not shown) supplying an electrolyte to each of the first chambers (anode chambers A1, A2, A3, A4), a first electrolyte and gas retrieving flow path (not shown) retrieving the electrolyte and gas from each of the first chambers, a second electrolyte supply flow path (not shown) supplying the electrolyte to each of the second chambers (C1, C2, C3, C4), and a second electrolyte and gas retrieving flow path (not shown) retrieving the electrolyte and gas from each of the second chambers.

In one preferred embodiment, each of the base body 4531 of the first terminal element 4500, the protruding flange part 4631*c* of the second terminal element 4600, and the base bodies 531 of the electrolysis elements 500 is formed of an electrically insulating material. Such an embodiment does not lead to short-circuiting even if the receiving part is in contact with the protruding flange part (531*c*, 4631*c*) received in this receiving part at each receiving part (531*a*, 4531*a*).

In another preferred embodiment, each of the base body 4531 of the first terminal element 4500, the protruding flange part 4631*c* of the second terminal element 4600, and the base bodies 531 of the electrolysis elements 500 is made from a metal. Such an embodiment can further improve tolerance to pressures inside chambers.

Figure 14:
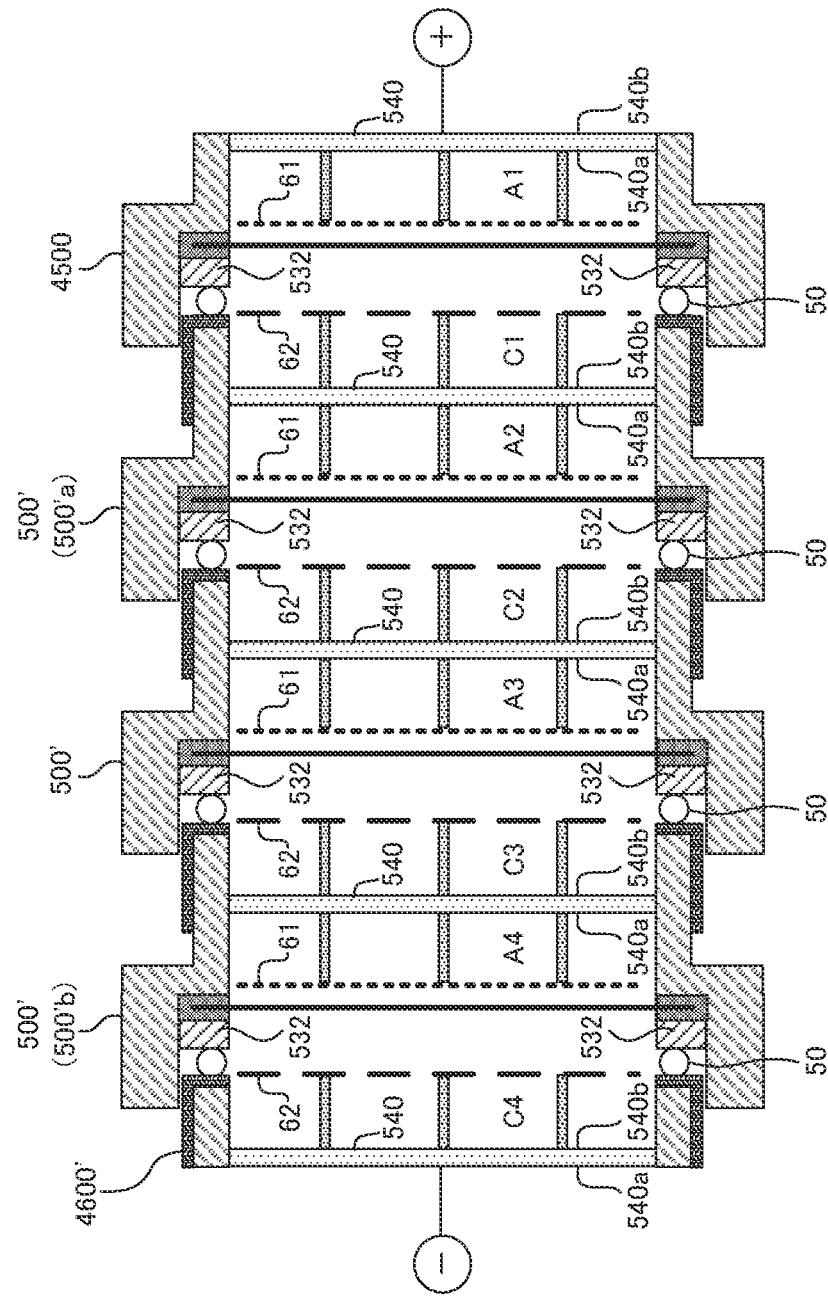
FIG. 14 is a schematically explanatory cross-sectional view of an electrolysis vessel 5000 according to still another embodiment of the present invention.

When each of the base body 4531 of the first terminal element 4500, the protruding flange part 4631*c* of the second terminal element 4600, and the base bodies 531 of the electrolysis elements 500 is made from a metal, for example, preferably: the inner periphery 531*as* of the receiving part 531*a* of the base body 531 of each of the electrolysis elements 500 in the circumferential direction has dimensions equal to or larger than those of the outer periphery 531*cs* of the protruding flange part 531*c* of each of the electrolysis elements 500 in the circumferential direction (see FIGS. 8B and 11); the dimensions of the inner periphery 4531*as* of the receiving part 4531*a* of the first terminal element 4500 in the circumferential direction (that is, the dimensions in a direction orthogonal to the direction across the sheet of FIGS. 12A and 12B between left and right; in other words, the dimensions in a cross-sectional face parallel to the first face 540*a* of the electroconductive separating wall 540 (first electroconductive separating wall) of the first terminal element 4500; or further, the dimensions in a cross-sectional face parallel to the main face of the separating membrane 10 (first separating membrane) of the first terminal element 4500) are larger than those of the outer periphery 531*cs* of the protruding flange part 531*c* of the first electrolysis element 500*a* in the circumferential direction (see FIGS. 11 to 12B); and the outer periphery 4631*cs* of the protruding flange part 4631*c* of the second terminal element 4600 in the circumferential direction has dimensions smaller than those of the inner periphery 531*as* of the receiving part 531*a* of the second electrolysis element 500*b* in the circumferential direction (see FIGS. 11 and 13). Such an embodiment makes it possible to arrange the electrolysis elements 500, the first terminal element 4500, and the second terminal element 4600 so that the receiving part and the protruding flange part (531*c*, 4631*c*) received in this receiving part are not directly in contact with each other at each receiving part (531*a*, 4531*a*) since each receiving part in the circumferential direction has dimensions larger than those of each protruding flange part in the circumferential direction, and thus can prevent short-circuiting. For example, preferably, the electrolysis vessel 4000 further includes: an electrical insulating member (first electrical insulating member) arranged such that the electrical insulating member prevents short-circuiting between the base body 4531 of the first terminal element 4500 and the base body 531 of the first electrolysis element 500a; an electrical insulating member (second electrical insulating member) arranged such that this electrical insulating member prevents short-circuiting between the protruding flange part 4631c of the second terminal element 4600 and the base body 531 of the second electrolysis element 500b; and an electrical insulating member (third electrical insulating member) arranged such that this electrical insulating member prevents short-circuiting between the base body 531 of one electrolysis element 500 and the base body 531 of the other electrolysis element 500 for each adjacent pair of the electrolysis elements 500, 500. Such an embodiment does not lead to short-circuiting even if the receiving part and the protruding flange part (531c, 4631c) received in this receiving part are in contact with each other at each receiving part (531a, 4531a). FIG. 14 is a schematically explanatory cross-sectional view of an electrolysis vessel 5000 according to such another embodiment. In FIG. 14, the elements already shown in FIGS. 2A to 13 are given the same reference signs as in FIGS. 2A to 13, and the description thereof may be omitted.

The electrolysis vessel 5000 is different from the above described electrolysis vessel 4000 (FIG. 11) in including the electrolysis elements 500', 500', . . . (see FIGS. 9A and 9B) instead of the electrolysis elements 500, 500, . . . , and in including a second terminal element 4600' instead of the second terminal element 4600. In the electrolysis vessel 5000, one of the electrolysis elements 500' including the protruding flange part 531'c facing the outside at one end of the stacked structure of the electrolysis elements 500', 500', . . . , is referred to as a first electrolysis element 500'a; and one of the electrolysis elements 500' including the receiving part 531a facing the outside at the other end of the stacked structure of the electrolysis elements 500', 500', . . . is referred to as a second electrolysis element 500'b.

Figure 15:
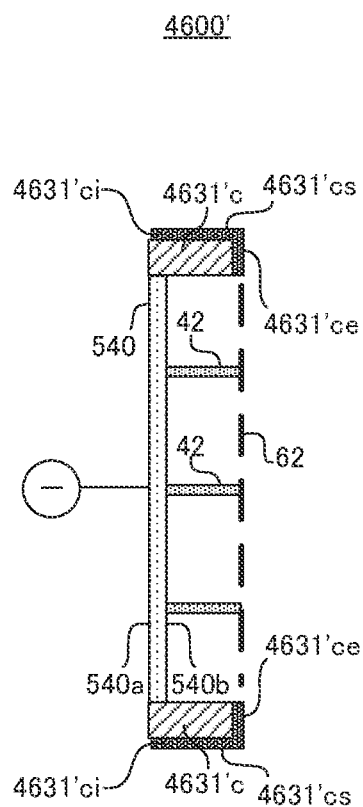
FIG. 15 is a schematically explanatory cross-sectional view of a second terminal element 4600'.

FIG. 15 is a schematically explanatory cross-sectional view of the second terminal element 4600'. In FIG. 15, the elements already shown in FIGS. 2A to 14 are given the same reference signs as in FIGS. 2A to 14, and the description thereof may be omitted. The second terminal element 4600' is different from the above described second terminal element 4600 (see FIG. 13) in including a protruding flange part (second protruding flange part) 4631'c instead of the protruding flange part (second protruding flange part) 4631c. The protruding flange part 4631'c is different from the above described protruding flange part 4631c of the second terminal element 4600 in that at least part of the surfaces of an end 4631'ce of the protruding flange part 4631c, and an outer periphery 4631'cs of the protruding flange part 4631'c which is continuous with the end 4631'ce is formed of an electrical insulating member 4631'ci. That is, at least part of the surfaces of the end 4631'ce of the protruding flange part 4631'c, and the outer periphery 4631'cs of the protruding flange part 4631'c, which is continuous with the end 4631'ce, is formed of the electrical insulating member 4631'ci, and the other parts in the protruding flange part 4631'c are made from a metal. Examples of the material of the electrical insulating member 4631'ci include electrically insulating materials same as described above concerning the material of the electrical insulating member 531'ci. A preferred aspect thereof is also the same as in the above description. In the second terminal element 4600', the dimensions of the outer periphery 4631'cs of the protruding flange part 4631'c including the electrical insulating member 4631'ci in the circumferential direction (that is, the dimensions in a direction orthogonal to the direction across the sheet of FIG. 15 between left and right; in other words, the dimensions in a cross-sectional face parallel to the second face 540b of the electroconductive separating wall 540 (second electroconductive separating wall) of the second terminal element 4600') are also smaller than or equal to those of the inner periphery of the receiving part 531a of the second electrolysis element 500'b in the circumferential direction.

Such an electrolysis vessel 5000 does not lead to short-circuiting even when the receiving part and the protruding flange part (531'c, 4631'c) received in the receiving part are in contact with each other at each receiving part (531a, 4531a).

Figure 16:
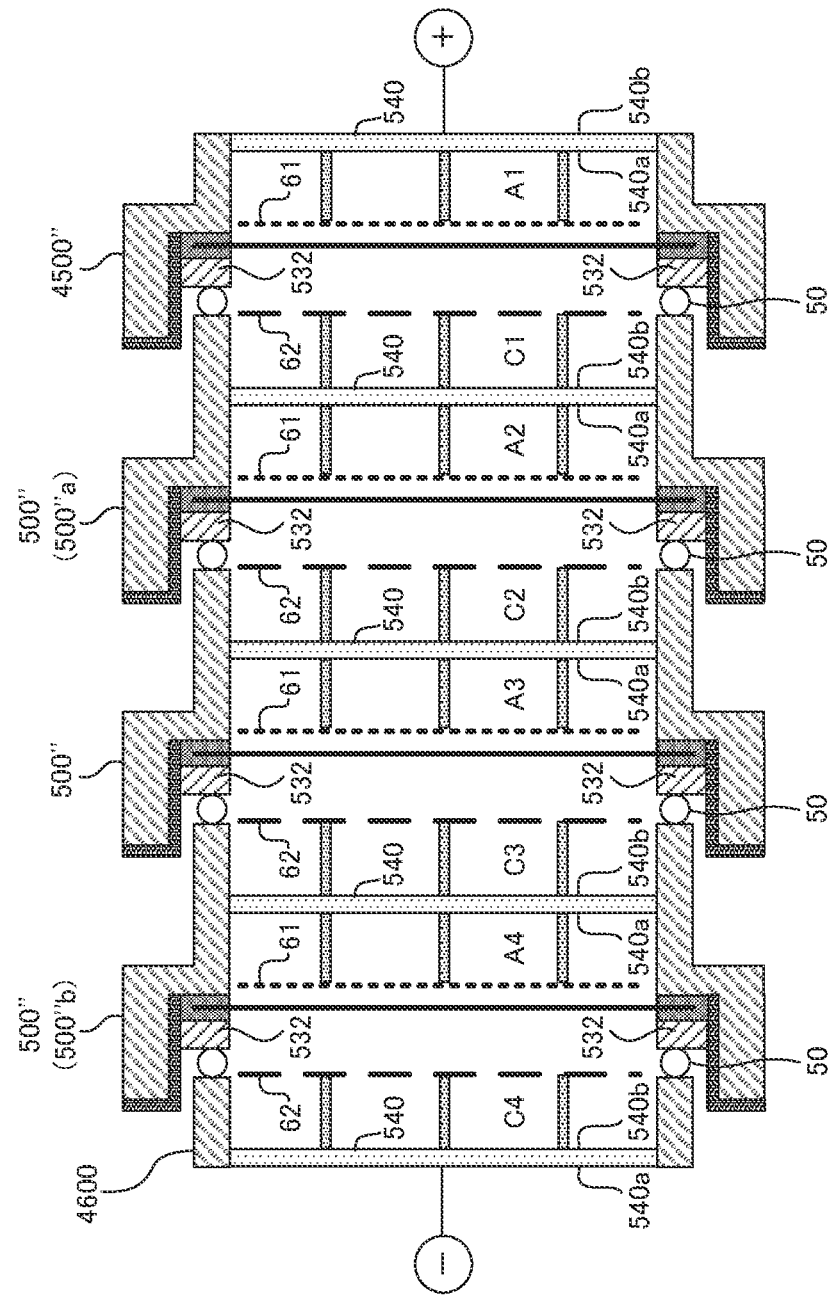
FIG. 16 is a schematically explanatory cross-sectional view of an electrolysis vessel 6000 according to still another embodiment of the present invention.

In the above description of the present invention, the electrolysis vessel 5000 including the protruding flange parts, each of which includes an electrical insulating member on its surface in order to prevent short-circuiting between the receiving parts and the protruding flange parts has been described as an example. The present invention is not limited to this embodiment. For example, the electrolysis vessel can include receiving parts each of which includes an electrical insulating member on its surface, to prevent short-circuiting between the receiving parts and the protruding flange parts. FIG. 16 is a schematically explanatory cross-sectional view of an electrolysis vessel 6000 according to such another embodiment. In FIG. 16, the elements already shown in FIGS. 2A to 15 are given the same reference signs as in FIGS. 2A to 15, and the description thereof may be omitted. The electrolysis vessel 6000 is different from the above described electrolysis vessel 4000 in including the electrolysis elements 500", 500", . . . (see FIGS. 10A and 10B) instead of the electrolysis elements 500, 500, . . . , and in including a first terminal element 4500" instead of the first terminal element 4500. In the electrolysis vessel 6000, one of the electrolysis elements 500" including the protruding flange part 531c facing the outside at one end of the stacked structure of the electrolysis elements 500", 500", . . . is referred to as a first electrolysis element 500"a; and one of the electrolysis elements 500" including the receiving part 531"a facing the outside at the other end of the stacked structure of the electrolysis elements 500", 500", . . . is referred to as a second electrolysis element 500"b.

Figure 17A:
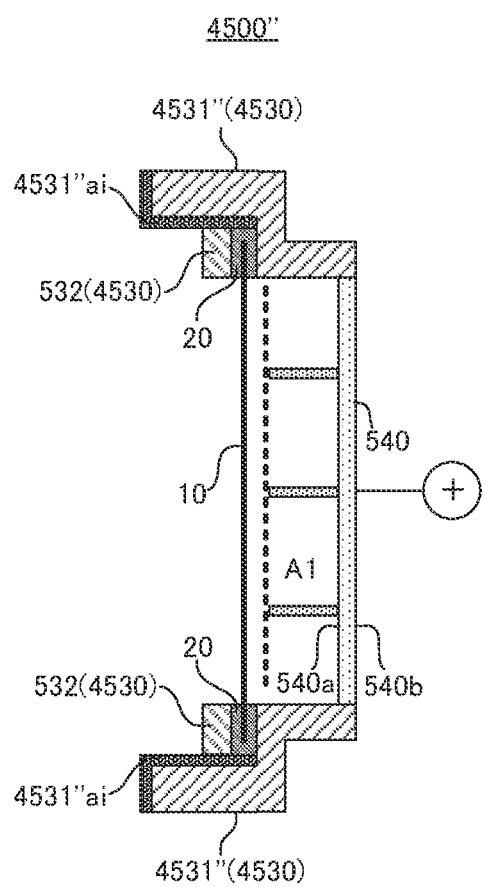
FIGS. 17A and 17B are schematically explanatory views of a first terminal element 4500"
Figure 17B:
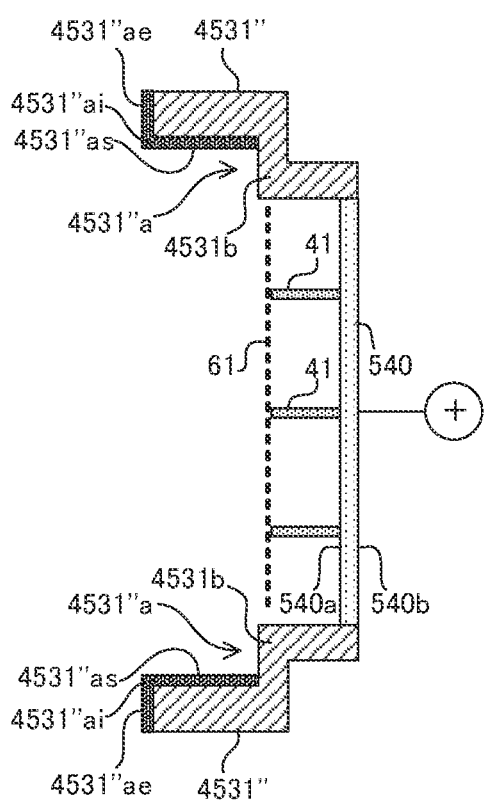

FIGS. 17A and 17B are schematically explanatory views of the first terminal element 4500". In FIGS. 17A and 17B, the elements already shown in FIGS. 2A to 16 are given the same reference signs as in FIGS. 2A to 16, and the description thereof may be omitted. FIG. 17A is a schematically explanatory cross-sectional view of the first terminal element 4500". FIG. 17B shows that the separating membrane 10, the gasket 20, and the lid member 532 are removed in FIG. 17A. The first terminal element 4500" is different from the first terminal element 4500 in including a base body (first base body) 4531" instead of the base body (first base body) 4531. The base body 4531" is different from the base body 4531 in that an inner periphery 4531"as of a receiving part (first receiving part) 4531"a, and the surface of an end 4531"ae of the base body 4531" which defines an end of the receiving part 4531"a are formed of an electrical insulating member 4531"ai. That is, the inner periphery 4531"as of the receiving part 4531"a, and the surface of the end 4531"ae of the base body 4531", which defines the end of the receiving part 4531"a, are formed of the electrical insulating member 4531"ai, and the other parts in the base body 4531" are made from a metal. Examples of the material of the electrical insulating member 4531"ai include electrically insulating materials same as described above concerning the material of the electrical insulating member 531'ci. A preferred aspect thereof is also the same as in the above description. In the first terminal element 4500", the inner periphery 4531"as of the receiving part 4531"a including the electrical insulating member 4531"ai in the circumferential direction also has dimensions equal to or larger than those of the outer periphery 531cs of the protruding flange part 531c of the first electrolysis element 500"a in the circumferential direction.

Such an electrolysis element 6000 does not lead to short-circuiting even when the receiving part and the protruding flange part (531c, 4631c) received in the receiving part are in contact with each other at each receiving part (531"a, 4531"a).

In the foregoing description concerning the present invention, the electrolysis elements 500, 500', and 500" which do not have a groove to fix the sealing member (O-ring) 50, and the electrolysis vessels 4000, 5000, and 6000 each including such an electrolysis element have been described as an example. The electrolysis vessels each including the electrolysis elements of the present invention prevent deformation of O-rings from exceeding the limit defined by the inner peripheries of the receiving parts even if the O-rings deform due to pressures inside chambers since the inner peripheries of the receiving parts are present on the sides of the outer peripheries of the sealing members. However, the present invention is not limited to those embodiments. For example, each of the electrolysis elements can have a groove (O-ring fixing groove) provided on a face of the lid member which faces the protruding flange part so that the O-ring can be fixed between the lid member and the end of the protruding flange part, and each of the electrolysis vessels can include such an electrolysis element. For example, each of the electrolysis elements can have a groove (O-ring fixing groove) provided on an end of the protruding flange part so that the O-ring can be fixed between the lid member and the end of the protruding flange part, and each of the electrolysis vessels can include such an electrolysis element. As described above concerning the electrolysis vessels 2000 and 3000, the O-ring fixing groove may have a cross-sectional shape corresponding to part of the cross-sectional shape of an O-ring (complementary with the cross-sectional shape of the O-ring), and may have a cross-sectional shape different from the above (such as a V-shape).

In the foregoing description concerning the present invention, the electrolysis vessels 4000, 5000, and 6000 each including O-rings as the sealing members 50 have been described as an example. The present invention is not limited to these embodiments. For example, each of the electrolysis vessels can include the electrolysis element of the present invention, which includes a flat gasket as the sealing member. The electrolysis vessels each including the electrolysis element of the present invention suppress deformation of the sealing member from exceeding the limit defined by the inner periphery of the receiving part even if the sealing member deforms due to pressures inside chambers since the inner periphery of the receiving part is present on the side of the outer periphery of the sealing member. Thus, the electrolysis vessels each including the electrolysis element of the present invention can further improve tolerance to pressures inside chambers even if the sealing member other than an O-ring, such as a flat gasket is used. An O-ring is preferably used as the sealing member in view of further improving tolerance to pressures inside chambers.

In the foregoing description concerning the present invention, the electrolysis vessels 1000, 2000, 3000, 4000, 5000, and 6000, and the electrolysis elements 500, 500', and 500" each including the first electrode 61 as an anode, and the second electrode 62 as a cathode have been described as an example. The present invention is not limited to these embodiments. For example, each of the electrolysis vessels and the electrolysis elements can include the first electrode as a cathode, and the second electrode as an anode.

In the foregoing description concerning the present invention, the separating membrane-gasket-protecting member assemblies 100 and 200, the electrolysis elements 500, 500', and 500", and the electrolysis vessels 1000, 2000, 3000, 4000, 5000, and 6000 each including the gasket 20 holding the periphery of the separating membrane 10, which is an integrated gasket: that is, each including the integrated gasket 20, for the inner periphery of which a slit is provided, into the slit the periphery of the separating membrane 10 being housed, such that the gasket 20 holds the periphery of the separating membrane 10 have been described as an example. The present invention is not limited to these embodiments. For example, the separating membrane-gasket-protecting member assemblies, the electrolysis elements, and the electrolysis vessels can each use a separating gasket instead of the integrated gasket 20: that is, two gasket members between which the periphery of the separating membrane 10 is sandwiched, such that the gasket members hold the periphery of the separating membrane 10.

<5. Alkaline Water Electrolysis Method>

The electrolysis vessels of the present invention can be particularly preferably used for alkaline water electrolysis. An alkaline water electrolysis method according to one embodiment is a method for electrolyzing alkaline water to produce hydrogen, the method including the step of (a) electrolyzing alkaline water using any of the electrolysis vessels of the present invention. Any electrolysis vessel described above can be used as the electrolysis vessel in the step (a). As alkaline water, a known basic aqueous solution used for producing hydrogen by the alkaline water electrolysis method (such as a KOH aqueous solution and a NaOH aqueous solution) can be employed without particular limitation.

The step (a) can be carried out by supplying an electrolyte (alkaline water) to each of the first chambers and the second chambers of any of the electrolysis vessels of the present invention, and applying an electric current so that a given electrolytic current flows between the anodes and the cathodes. Gas generated by the electrolysis is retrieved from each chamber along with the electrolyte, to be subjected to gas-liquid separation, which makes it possible to retrieve hydrogen gas from the cathode chambers, and oxygen gas from the anode chambers. The electrolyte separated from gas by the gas-liquid separation can be supplied again to each chamber as water is added to the electrolyte as necessary.

In the step (a), the first chambers may be anode chambers, and the second chambers may be cathode chambers; or the first chambers may be cathode chambers, and the second chambers may be anode chambers. In either case, pressures inside cathode chambers is kept higher than atmospheric pressure by 20 kPa or more. Pressures inside cathode chambers are preferably higher than atmospheric pressure by 400 kPa or more, and more preferably higher than atmospheric pressure by 800 kPa or more. The upper limit of the pressures inside cathode chambers can be, for example, lower than "atmospheric pressure plus 1000 kPa", depending on the strength of the members forming the electrolysis vessel though. Pressures inside cathode chambers at this lower limit or more can lower the compression ratio in the step of increasing pressure after hydrogen gas is retrieved from the cathode chambers, or makes it possible to omit this increasing step, which can reduce costs for equipment, and achieve space saving and energy efficiency for the entire equipment. Pressures inside cathode chambers at this lower limit or more also make the size of air bubbles generated in the cathode chambers small, which reduces the resistance between the anodes and the cathodes, and thus can lower the electrolysis voltage.

In the step (a), preferably, pressures inside anode chambers are also kept higher than atmospheric pressure by 20 kPa or more. Pressures inside anode chambers are preferably higher than atmospheric pressure by 400 kPa or more, and more preferably higher than atmospheric pressure by 800 kPa or more. The upper limit of pressures inside anode chambers can be, for example, lower than "atmospheric pressure plus 1000 kPa", depending on the strength of the members forming the electrolysis vessel though. Pressures inside anode chambers at this lower limit or more can lower the compression ratio in the step of increasing pressure after oxygen gas is retrieved from the anode chambers, or makes it possible to omit this increasing step, which can further reduce costs for equipment, and achieve further space saving and energy efficiency for the entire equipment. s anode chambers at this lower limit or more also make the size of air bubbles generated in the anode chambers smaller, which further reduces the resistance between the anodes and the cathodes, and thus can further lower the electrolysis voltage.

In the step (a), the difference between pressures inside cathode chambers and pressures inside anode chambers is, for example, preferably lower than 5.0 kPa, and more preferably lower than 1.0 kPa. The difference between pressures inside cathode chambers and pressures inside anode chambers lower than this upper limit makes it easy to suppress gas transmitted through the separating membranes to move from the anode chambers to the cathode chambers, or from the cathode chambers to the anode chambers, which is caused by the differential pressure between the anode chambers and the cathode chambers, and to suppress the situation where the separating membranes are damaged, which is caused by the differential pressure between the anode chambers and the cathode chambers.

In the electrolysis vessels of the present invention, tolerance to pressures inside chambers is improved, and deterioration of the properties of the separating membranes due to heat and mechanical pressure that the separating membranes receive is suppressed. Thus, alkaline water electrolysis using any of the electrolysis vessels of the present invention can result in safer and more effective electrolysis even under the condition where pressures inside chambers are increased.

REFERENCE SIGNS LIST 10 (ion-permeable) separating membrane
20 gasket
30, 230, 530, 4530 (frame-shaped) protecting member
31, 231, 531, 531', 531", 4531, 4531" (frame-shaped) base body
31a, 531a, 531"a, 4531a, 4531"a receiving part
31b, 531b, 4531b supporting part
231e, 3040c first O-ring fixing groove
231f, 3040d second O-ring fixing groove
32, 532 (frame-shaped) lid member
40, 540, 3040 electroconductive separating wall
40a, 540a first face
40b, 540b second face
41, 42 electroconductive rib
50 sealing member
61 first electrode
62 second electrode
531c, 531'c, 4631c, 4631'c protruding flange part
531'ci, 531"ai, 4631'ci, 4531"ai electrical insulating member
100, 200 separating membrane-gasket-protecting member assembly
500, 500', 500" electrolysis element
500a first electrolysis element
500b second electrolysis element
4500, 4500" first terminal element
4600, 4600' second terminal element
1000, 2000, 3000, 4000, 5000, 6000 electrolysis vessel
A1, A2, A3, A4 anode chamber
C1, C2, C3, C4 cathode chamber

We claim:

1. An electrolysis vessel comprising:
a plurality of electroconductive separating wall each having a first face and a second face, wherein each adjacent pair of the electroconductive separating walls comprising a first electroconductive separating wall and a second electroconductive separating wall is arranged such that the first face of the first electroconductive separating wall faces the second face of the second electroconductive separating wall;
a plurality of separating membrane-gasket-protecting member assembly each arranged between each adjacent pair of the electroconductive separating walls; and
sealing members each arranged between each adjacent pair of the electroconductive separating wall and the separating membrane-gasket-protecting member assembly,
the separating membrane-gasket-protecting member assembly comprising:
an ion-permeable separating membrane;
a gasket holding a periphery of the separating membrane; and
a frame-shaped and electrically insulating protecting member holding the gasket, the protecting member comprising:
a frame-shaped base body; and
a frame-shaped lid member;
the base body comprising:
a receiving part being arranged in an inner periphery of the base body and receiving the gasket and the lid member;
a supporting part protruding from the receiving part and extending toward an inner periphery side of the base body, and supporting the gasket received in the receiving part in a direction crossing a main face of the separating membrane; and
the lid member having dimensions such that the lid member can be received in the receiving part of the base body,
the gasket and the lid member being received in the receiving part of the base body, such that the gasket is sandwiched between the supporting part of the base body and the lid member,
the gasket being in direct physical contact with both faces of the separating membrane,
each adjacent pair of the first face of the electroconductive separating wall and the separating membrane facing the first face of the electroconductive separating wall defining a first chamber therebetween, the first chamber comprising a first electrode arranged therein and electrically connected with the electroconductive separating wall of the pair defining the first chamber; and
each adjacent pair of the second face of the electroconductive separating wall and the separating membrane facing the second face of the electroconductive separating wall defining a second chamber therebetween, the second chamber comprising a second electrode arranged therein and electrically connected with the electroconductive separating wall of the pair defining the second chamber, wherein an outer periphery of the lid member has same dimensions as an inner periphery of the receiving part of the base body, an inner periphery of the lid member has same dimensions as an inner periphery of the supporting part of the base body, a thickness of the lid member is such that a total of thickness of the gasket holding the separating membrane and the thickness of the lid member is same as a depth of the receiving part of the base body, in the stacking direction, a pressure inside the first chamber is kept higher than atmospheric pressure by 400 kPa or more, and a pressure inside the second chamber is kept higher than atmospheric pressure by 400 kPa or more.

2. The electrolysis vessel according to claim 1, wherein the sealing members are O-rings; and
each of the protecting members comprising:
   a first groove provided in a first face of the frame-shaped base body, such that the O-ring can be fixed between the frame-shaped base body and the first face of the electroconductive separating wall, the first face of the frame-shaped base body facing the first face of the electroconductive separating wall; and
   a second groove provided in a second face of the frame shaped base body, such that the O-ring can be fixed between the frame-shaped base body and the second face of the electroconductive separating wall, the second face of the frame-shaped base body facing the second face of the electroconductive separating wall.

3. The electrolysis vessel according to claim 1, wherein the sealing members are O-rings; and
each of the electroconductive separating walls comprising:
   a first groove provided in the first face of the electroconductive separating wall, such that the O-ring can be fixed between the first face of the electroconductive separating wall and the frame-shaped base body; and
   a second groove provided in the second face of the electroconductive separating wall, such that the O-ring can be fixed between the second face of the electroconductive separating wall and the frame-shaped base body.

4. An electrolysis element comprising:
an ion-permeable separating membrane;
a gasket holding a periphery of the separating membrane;
a frame-shaped protecting member holding the gasket; and
an electroconductive separating wall having a first face and a second face;
the protecting member comprising:
   a frame-shaped base body; and
   a frame-shaped lid member;
the base body comprising:
   a receiving part arranged in an inner periphery of the base body and receiving the gasket and the lid member; and
   a supporting part protruding from the receiving part and extending toward an inner periphery side of the base body, and supporting the gasket received in the receiving part in a direction crossing a main face of the separating membrane;
the lid member having dimensions such that the lid member can be received in the receiving part of the base body,
wherein the gasket and the lid member are received in the receiving part of the base body, such that the gasket is sandwiched between the supporting part of the base body and the lid member;
the gasket is in direct physical contact with both faces of the separating membrane;
the electroconductive separating wall is arranged such that the first face of the electroconductive separating wall faces the separating membrane;
an outer periphery of the electroconductive separating wall is joined with an inner periphery of the supporting part of the base body, or is united with the inner periphery of the supporting part of the base body into one body;
the frame-shaped base body comprises a protruding flange part being continuous with the supporting part and protruding from the outer periphery of the electroconductive separating wall toward a side of the second face of the electroconductive separating wall; and
an outer periphery of the protruding flange part has dimensions smaller than or equal to dimensions of an inner periphery of the receiving part.

5. An electrolysis vessel comprising:
a stacked structure comprising a plurality of the electrolysis element as defined in claim 4 being stacked, wherein for each adjacent pair of the electrolysis elements comprising a first electrolysis element and a second electrolysis element, at least part of the protruding flange part of the first electrolysis element is further received in the receiving part of the second electrolysis element, such that the protruding flange part of the first electrolysis element and the supporting part of the second electrolysis element sandwich the gasket and the lid member of the second electrolysis element, to hold the gasket and the lid member of the second electrolysis element therebetween;
each adjacent pair of the first face of the electroconductive separating wall and the separating membrane facing the first face of the electroconductive separating wall defining a first chamber therebetween, the first chamber comprising a first electrode arranged therein and electrically connected with the electroconductive separating wall of the pair defining the first chamber; and
each adjacent pair of the second face of the electroconductive separating wall and the separating membrane facing the second face of the electroconductive separating wall defining a second chamber therebetween, the second chamber comprising a second electrode arranged therein and electrically connected with the electroconductive separating wall of the pair defining the second chamber.

6. The electrolysis vessel according to claim 5, wherein for each adjacent pair of the electrolysis elements comprising the first electrolysis element and the second electrolysis element, the protruding flange part of the first electrolysis element and the lid member of the second electrolysis element sandwich an O-ring as a sealing member, to hold the O-ring therebetween.

7. The electrolysis vessel according to claim 5,
the stacked structure comprising a third electrolysis element arranged at a first end of the stacked structure and a fourth electrolysis element arranged at a second end of the stacked structure;
the electrolysis vessel further comprising:
a first terminal element arranged such that the first terminal element faces the second face of the electroconductive separating wall of the third electrolysis element; and
a second terminal element arranged such that the second terminal element faces the separating membrane of the fourth electrolysis element;
the first terminal element comprising:
an ion-permeable first separating membrane;
a first gasket holding a periphery of the first separating membrane;
a frame-shaped first protecting member holding the first gasket; and
a third electroconductive separating wall having a first face and a second face;
the first protecting member comprising:
a frame-shaped first base body; and
a frame-shaped first lid member;
the first base body comprising:
a first receiving part arranged in an inner periphery of the first base body and receiving the first gasket and the first lid member; and
a first supporting part protruding from the first receiving part and extending toward an inner periphery side of the first base body, and supporting the first gasket received in the first receiving part in a direction crossing a main face of the first separating membrane;
the first lid member having dimensions such that the first lid member can be received in the first receiving part of the first base body;
the first gasket and the first lid member being received in the first receiving part of the first base body, such that the first gasket is sandwiched between the first supporting part and the first lid member;
the third electroconductive separating wall being arranged such that the first face of the third electroconductive separating wall faces the first separating membrane;
an outer periphery of the third electroconductive separating wall being joined with an inner periphery of the first supporting part of the first base body, or being united with the inner periphery of the first supporting part of the first base body into one body;
at least part of the protruding flange part of the third electrolysis element being further received in the first receiving part of the first terminal element, such that the protruding flange part of the third electrolysis element and the first supporting part of the first terminal element sandwich the first gasket and the first lid member of the first terminal element, to hold the first gasket and the first lid member of the first terminal element therebetween;
the second terminal element comprising:
a fourth electroconductive separating wall having a first face and a second face; and
a second protruding flange part being joined with an outer periphery of the fourth electroconductive separating wall or being united with the outer periphery of the fourth electroconductive separating wall into one body, wherein a first end of the second protruding flange part protrudes from the outer periphery of the fourth electroconductive separating wall and extends toward a side of the second face of the fourth electroconductive separating wall;
an outer periphery of the second protruding flange part having dimensions smaller than or equal to the dimensions of the inner periphery of the receiving part of the fourth electrolysis element, at least at the first end of the second protruding flange part;
at least part of the second protruding flange part of the second terminal element being further received in the receiving part of the fourth electrolysis element, such that the second protruding flange part of the second terminal element and the supporting part of the fourth electrolysis element sandwich the gasket and the lid member of the fourth electrolysis element, to hold the gasket and the lid member of the fourth electrolysis element therebetween;
the first face of the third electroconductive separating wall of the first terminal element and the first separating membrane further defining another first chamber therebetween, the another first chamber comprising another first electrode arranged therein and electrically connected with the third electroconductive separating wall;
the second face of the electroconductive separating wall of the third electrolysis element and the first separating membrane of the first terminal element further defining another second chamber therebetween, the another second chamber comprising another second electrode arranged therein and electrically connected with the electroconductive separating wall of the third electrolysis element; and
the second face of the fourth electroconductive separating wall of the second terminal element and the separating membrane of the fourth electrolysis element further defining yet another second chamber therebetween, the yet another second chamber comprising yet another second electrode arranged therein and electrically connected with the fourth electroconductive separating wall.
8. The electrolysis vessel according to claim 7,
the protruding flange part of the third electrolysis element and the first lid member of the first terminal element sandwiching a first O-ring as a sealing member, to hold the first O-ring therebetween; and
the second protruding flange part of the second terminal element and the lid member of the fourth electrolysis element sandwiching a second O-ring as a sealing member, to hold the second O-ring therebetween.
9. The electrolysis vessel according to claim 5,
wherein the frame-shaped first base body of the first terminal element, the second protruding flange part of the second terminal element, and each of the frame-shaped base bodies of the electrolysis elements are electrically insulating.
10. The electrolysis vessel according to claim 5,
the frame-shaped first base body of the first terminal element, the second protruding flange part of the second terminal element, and each of the frame-shaped base bodies of the electrolysis elements each comprising an electroconductive material;
the electrolysis vessel further comprising:
a first electrical insulating member arranged such that the first electrical insulating member prevents short-circuiting between the frame-shaped first base body of the first terminal element and the frame-shaped base body of the third electrolysis element;

a second electrical insulating member arranged such that the second electrical insulating member prevents short-circuiting between the second protruding flange part of the second terminal element and the frame-shaped base body of the fourth electrolysis element; and a third electrical insulating member arranged such that the third electrical insulating member prevents short-circuiting between the frame-shaped base bodies of each adjacent pair of the electrolysis elements.

\* \* \* \* \*